(12) United States Patent
Willard

(10) Patent No.: US 9,598,250 B1
(45) Date of Patent: Mar. 21, 2017

(54) FALL PROTECTION UNIT FOR FORKLIFT TRUCKS SERVICING FLATBED TRAILERS

(71) Applicant: SAM CARBIS ASSET MANAGEMENT, LLC, Florence, SC (US)

(72) Inventor: Ronald D. Willard, Little River, SC (US)

(73) Assignee: SAM CARBIS ASSET MANAGEMENT, LLC, Florence, SC (US)

( * ) Notice: Subject to any disclaimer, the term of this patent is extended or adjusted under 35 U.S.C. 154(b) by 284 days.

(21) Appl. No.: 14/623,128

(22) Filed: Feb. 16, 2015

Related U.S. Application Data

(60) Provisional application No. 61/977,365, filed on Apr. 9, 2014.

(51) Int. Cl.
| | |
|---|---|
| *B65G 69/28* | (2006.01) |
| *E04H 17/00* | (2006.01) |
| *B65G 69/22* | (2006.01) |
| *B65G 69/24* | (2006.01) |

(52) U.S. Cl.
CPC ......... *B65G 69/2876* (2013.01); *E04H 17/00* (2013.01); *B65G 69/22* (2013.01); *B65G 69/24* (2013.01)

(58) Field of Classification Search
CPC ........ B65G 69/22; B65G 69/24; B65G 69/28; B65G 69/2864; B65G 69/2876; B60R 3/005
See application file for complete search history.

(56) References Cited

U.S. PATENT DOCUMENTS

| | | | | |
|---|---|---|---|---|
| 4,776,429 A | * | 10/1988 | Osborn | E04G 1/20 |
| | | | | 182/144 |
| 5,042,612 A | * | 8/1991 | Bennett | B65G 69/22 |
| | | | | 182/1 |
| 5,299,386 A | * | 4/1994 | Naegelli | E01F 13/06 |
| | | | | 49/27 |
| 6,502,709 B1 | | 1/2003 | Parker | |
| 7,140,467 B2 | | 11/2006 | Cook | |

(Continued)

FOREIGN PATENT DOCUMENTS

| | | | | |
|---|---|---|---|---|
| CA | 2851841 A1 | * | 12/2014 | ............... E04G 1/34 |
| FR | EP 1022241 A1 | * | 7/2000 | ............... B65F 9/00 |

OTHER PUBLICATIONS

Carbis Incorporated, Fall Prevention for the Metals Service Center Institute, Dec. 2012.
Engineering Drawings, Dec. 2012.

*Primary Examiner* — Jonathan Masinick
(74) *Attorney, Agent, or Firm* — Dority & Manning, P.A.

(57) ABSTRACT

Each of a pair of barrier platforms is carried by a pair of carrier stanchions, one disposed to each opposite side of a loading bay in a warehouse environment for a flatbed trailer carrying pallets that must be loaded and unloaded by forklift trucks. Each pair of carrier stanchions also supports a motor that can be operated to raise and to lower, as desired, one of the pair of barrier platforms that in the lowered position provides fall protection for the forklift trucks that service the flatbed trailer. Each barrier platform includes a forklift rub rail and carriages that are configured to cooperate with the carrier stanchions to resiliently absorb impacts from collisions with the forklift.

18 Claims, 19 Drawing Sheets

(56) References Cited

U.S. PATENT DOCUMENTS

| | | | |
|---|---|---|---|
| 7,802,652 B2 | 9/2010 | Bennett et al. | |
| 7,832,525 B2* | 11/2010 | Bennett | B65G 69/22 |
| | | | 182/36 |
| 8,341,821 B2 | 1/2013 | Honeycutt | |
| 8,561,239 B2 | 10/2013 | Honeycutt et al. | |
| 8,985,274 B2* | 3/2015 | Sun | E04G 1/22 |
| | | | 182/12 |
| 2010/0006375 A1* | 1/2010 | Southworth | B65G 69/24 |
| | | | 182/179.1 |
| 2013/0219790 A1 | 8/2013 | Honeycutt et al. | |

* cited by examiner

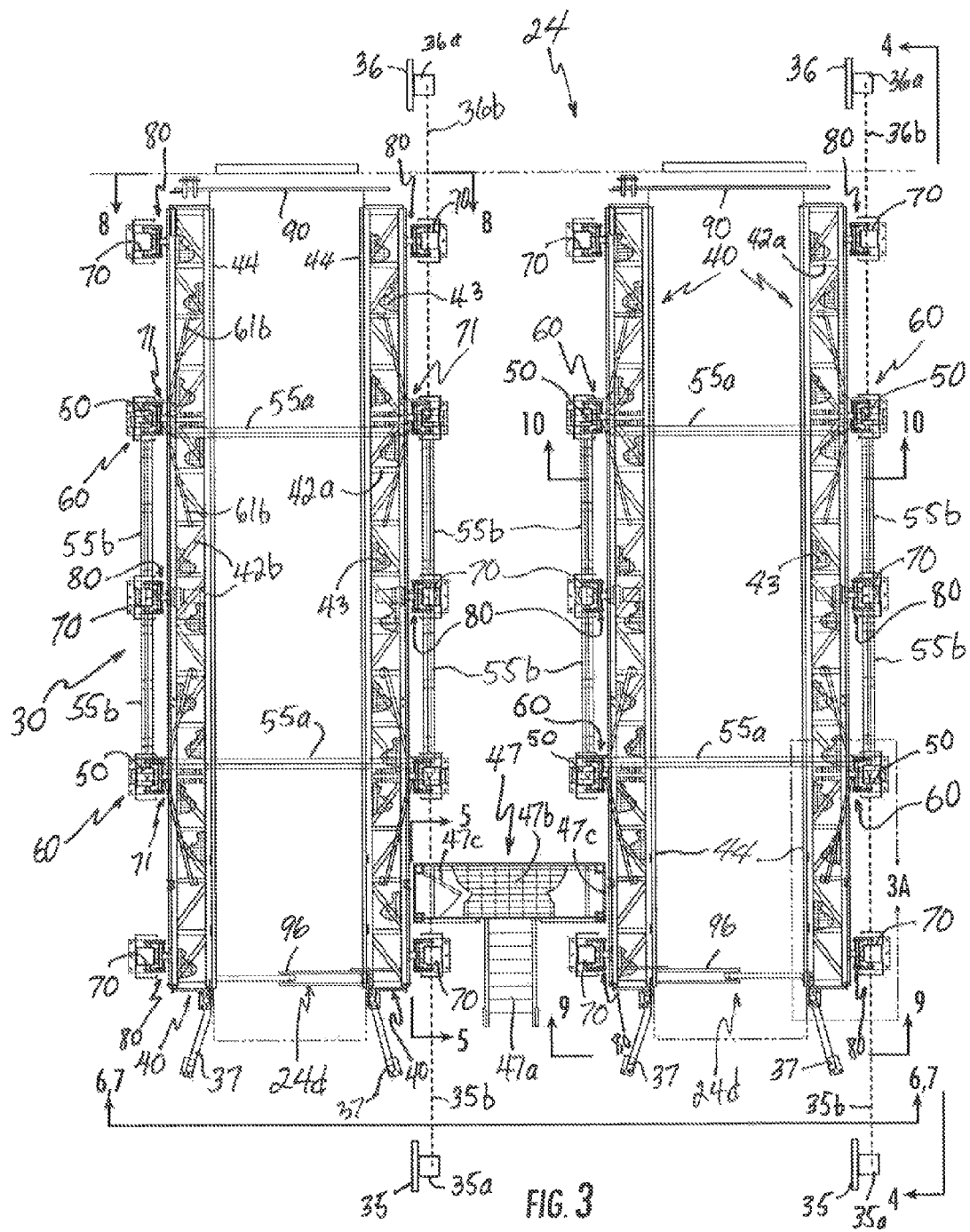

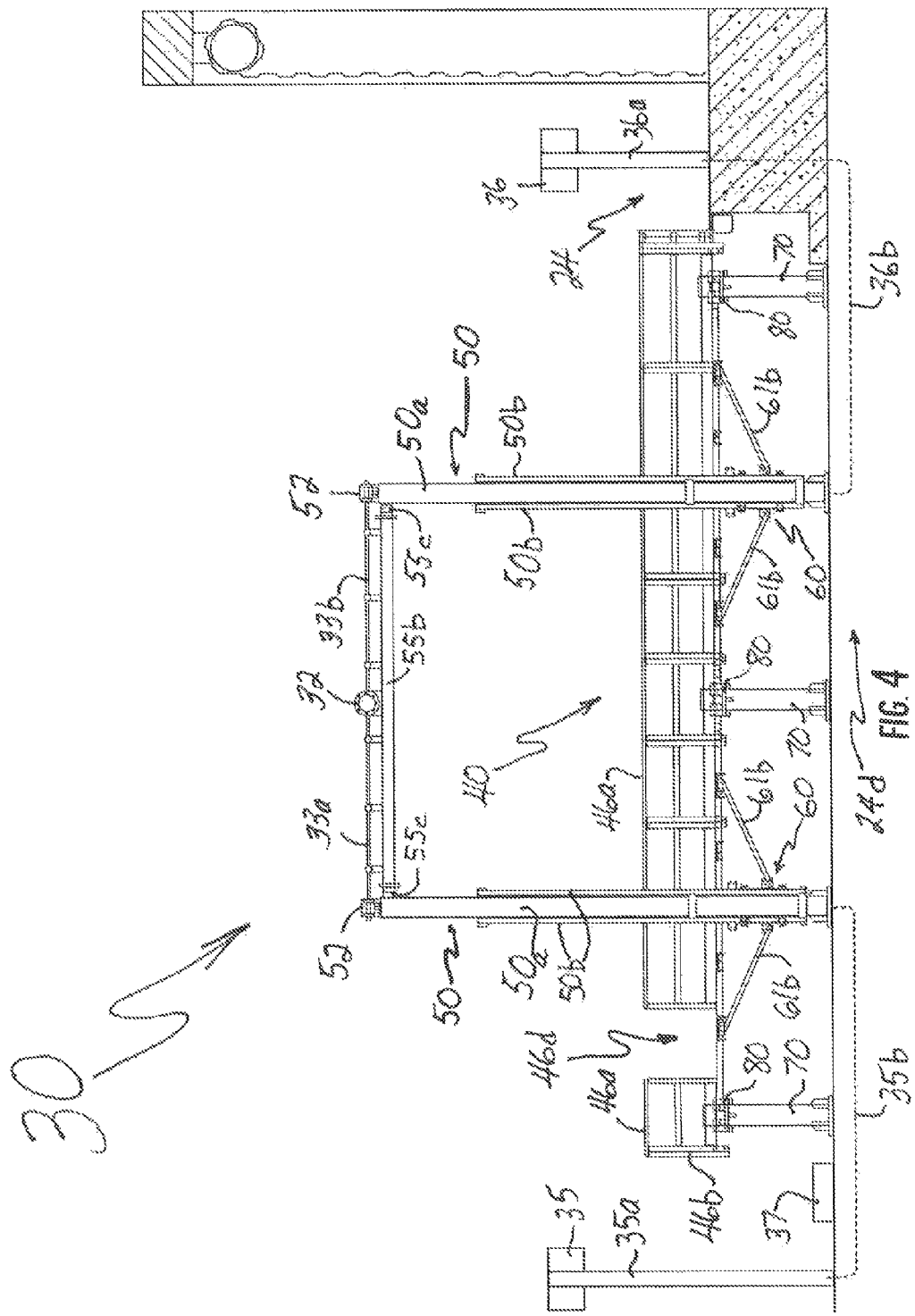

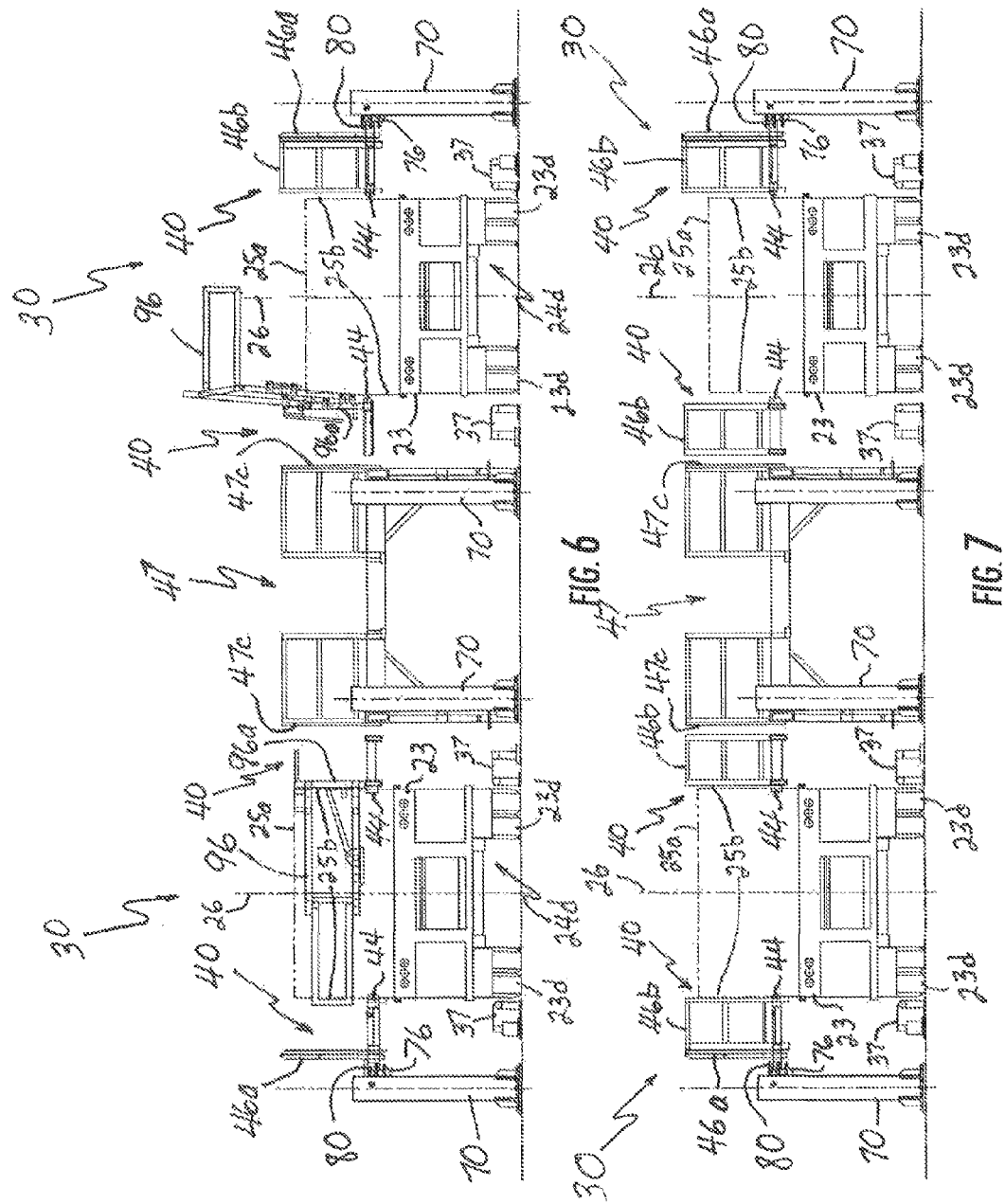

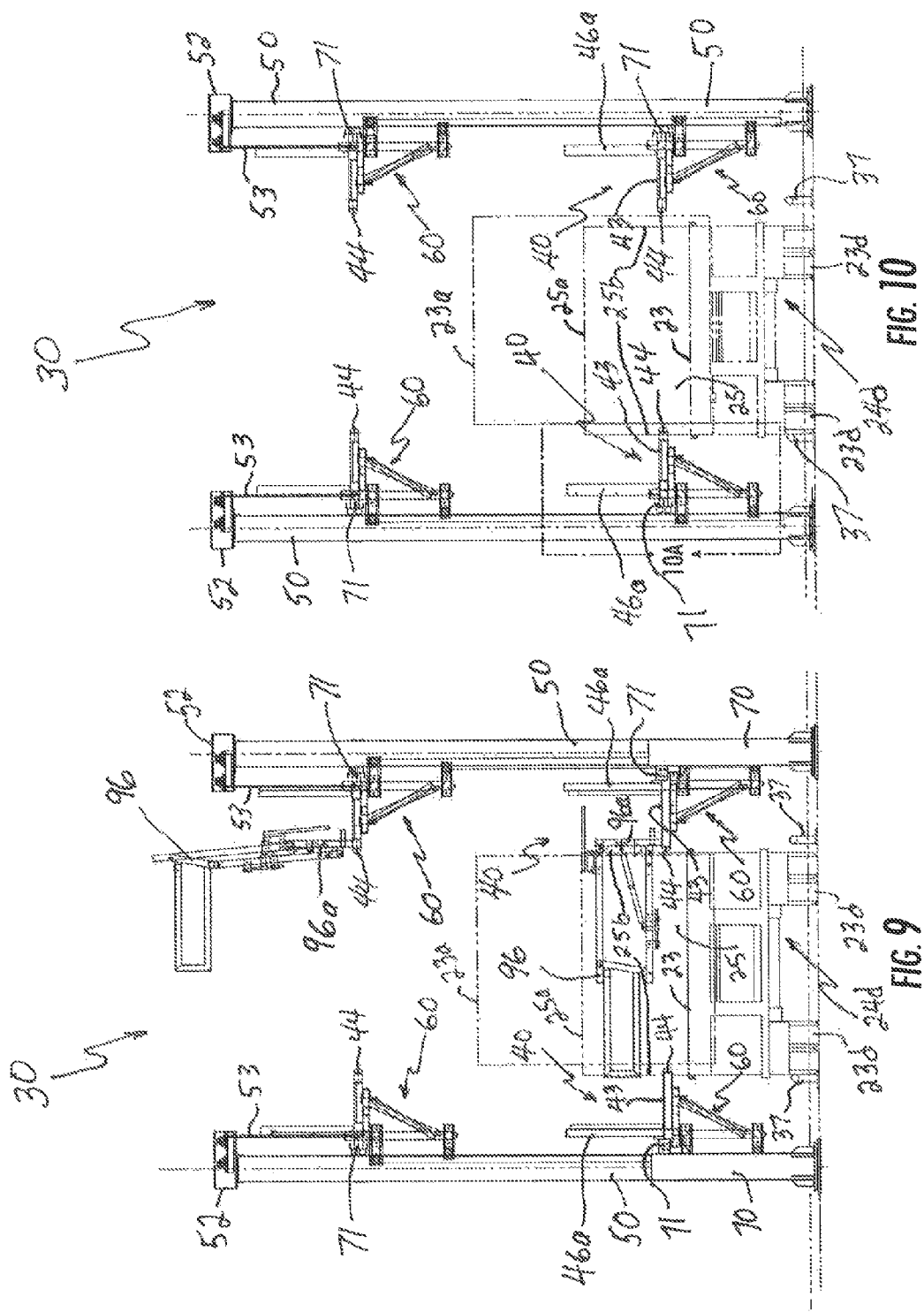

FALL PROTECTION UNIT FOR FORKLIFT TRUCKS SERVICING FLATBED TRAILERS

CROSS-REFERENCE TO RELATED APPLICATIONS

This application claims priority to provisional application Ser. No. 61/977,365, filed on Apr. 9, 2014, which by this reference is hereby incorporated herein in its entirety for all purposes.

STATEMENT REGARDING FEDERALLY SPONSORED RESEARCH OR DEVELOPMENT

Not applicable.

FIELD OF THE INVENTION

The subject matter disclosed herein generally involves safety apparatus for forklift trucks operating in a warehouse environment serviced by flatbed trailers carrying pallets that must be loaded and unloaded by the forklift trucks.

BACKGROUND OF THE INVENTION

A typical warehouse environment is schematically shown in FIG. 1 and designated generally by the numeral 20. A loading dock 24 is disposed in front of the warehouse 20, and the loading dock 24 includes a plurality of bays 24d. Each bay 24d accommodates a flatbed trailer 23 that is backed up to the loading dock 24 in front of the warehouse 20, which is serviced by a forklift truck 21. As shown in FIG. 1 for example, some flatbed trailers 23 have a headboard 23c disposed at the end of the flatbed trailer 23 next to the cab 23a. Some flatbed trailers 23 have a set of wheels 23d beneath the end near the headboard 23c as well as at least one set of wheels 23d at the rear end of the flatbed trailer 23. A typical loading dock 24 will have several bays 24d so that several flatbed trailers 23 can be loaded and unloaded at the same time by several forklift trucks 21.

The back end of the loading dock 24 is an extension of the floor of a warehouse 20 that often has several vertically articulating overhead doors 20a controlling ingress and egress between the inside of the warehouse 20 and the loading dock 24. As shown in FIG. 1, the floor 24a of the loading dock 24 typically includes an overhang 24b, which typically is a metal plate that extends the floor 24a beyond the edge of the loading dock 24 and is disposed at a height that is just above the height of the flatbed trailer 23. The rear end of the flatbed trailer 23 can be slid beneath the overhang 24b when the rear end of the flatbed trailer 23 abuts against the rubber bumper 24c that often protects the forward free edge of the loading dock 24 beneath the overhang 24b.

In the view of FIG. 1, parts of the loading dock 24 and overhang plate 24b have been cut away so that the viewer can see the rear end of the flatbed trailer 23 slid beneath the overhang 24b and abutting against the rubber bumper 24c at the forward free end of one of the bays 24d of the loading dock 24. Though not shown in FIG. 1, some loading docks 24 will have extensions of the loading dock 24 that project alongside and between two adjacent the loading bays 24d so that the forklift trucks 21 can be driven directly onto the sides of the flatbed trailers parked into such adjacent loading bays 24d.

As shown in FIG. 1, many warehouse environments 20 rely on a forklift truck 21 for carrying and placing each pallet 22 onto a flatbed trailer 23 and removing each pallet 22 from the flatbed trailer 23. The truck cab 23a backs the attached flatbed trailer 23 into a loading bay 24d of a loading dock 24 at the warehouse 20. The forklift truck 21 drives out of the warehouse 20, across the floor 24a of the loading dock 24 and onto the flatbed trailer 23 to load or unload each pallet 22 containing cargo (not shown).

In addition to concentrating on placement of each pallet 22, the driver of the forklift truck 21 also must guard against losing track of the whereabouts of the side edges 23b of the flatbed trailer 23. The forklift operator must operate the forklift 21 so as to prevent any of the wheels 21a of the forklift truck 21 from driving past the side edge 23b of the flatbed trailer 23 and causing an accident that topples the forklift truck 21 and/or the pallet 22 and its cargo off the trailer 23.

For any such accident could injure the driver of the forklift truck 21, injure other workers in the area and/or damage the forklift truck 21 and the cargo on the pallet 22 being carried by the forklift truck 21 or in the vicinity of the forklift truck 21. Moreover, any fall protection apparatus for the forklift truck 21 must be sturdy enough to stop the forklift truck 21 from toppling over the side edges 23b of the flatbed trailer 23, forgiving enough so as to avoid damaging the forklift truck 21 in the process yet resilient enough to avoid suffering damage to itself from repeated impacts from the forklift truck 21. Additionally, any fall protection apparatus for the forklift truck 21 must not unduly interfere with the need for worker access to the flatbed trailer 23 so that workers are not inhibited from performing such tasks as installing tarps (not shown) over the cargo and removing same and strapping down the cargo and removing the straps (not shown) before unloading the cargo.

BRIEF DESCRIPTION OF THE INVENTION

Aspects and advantages of the invention are set forth below in the following description, or may be obvious from the description, or may be learned through practice of embodiments of the invention.

One embodiment of the inventive safety apparatus includes a forklift fall protection unit that prevents forklifts from riding off the edge of a flatbed trailer when the forklift is either loading pallets onto the flatbed or removing pallets from the flatbed. An embodiment of the forklift fall protection unit desirably can have two barrier platforms spaced apart from one another and having a far greater length dimension than width dimension. One of the barrier platforms is positioned to one side of a flatbed loading bay, and the other barrier platform is positioned to the opposite side of the flatbed loading bay. In this way, each of the long sides of the flatbed that is backed into the loading bay will be guarded by one of the barrier platforms. Each barrier platform desirably has an inner rail that carries a bumper disposed toward the interior of the trailer bay.

Each barrier platform is carried by two vertically extending carrier stanchions that are spaced apart from each other in the direction of the length, i.e., the longer dimension of the loading bay. Each of the carrier stanchions of the pair of vertically extending carrier stanchions situated on one side of the bay is connected via one end of a chain to a main drive carriage, which is connected to one of the barrier platforms. The opposite end of the chain extends inside the carrier stanchion and desirably is connected to a counterweight. The chains connected to the main drive carriages of each barrier platform are reeled into the carrier stanchions to raise the barrier platform and played out from the carrier stanchions to lower the barrier platform. As the main drive carriage descends, the counterweight will ascend, and as the main drive carriage ascends, the counterweight will descend.

Each main drive carriage desirably has high-strength compression springs mounted so as to allow each main drive carriage to absorb about two inches of compression to slow the forklift to a stop if the forklift were to run into the bumper on the inner rail of the barrier platform. Each main drive carriage desirably includes stainless steel rollers that allow the main drive carriage to track up and down on tracks mounted to a respective one of the pair of the carrier stanchions and thus selectively raise or lower the barrier platform.

The chains connected to the main drive carriages of each barrier platform are selectively reeled in or played out by a hydraulic motor-driven pair of chain sprockets. One drive chain sprocket is positioned at the top of each of the four carrier stanchions. Each motor rotates the two drive chain sprockets on its side of the loading bay simultaneously via two horizontally extending drive shafts. Each drive shaft extends out of each opposite end of a gear box that is driven by the hydraulic motor to rotate a respective drive chain sprocket atop one of the carrier stanchions. The motors desirably are controlled so that both barrier platforms move simultaneously, whether ascending or descending, and are stopped when at least one of the main drive carriages trips a limit switch.

The two carrier stanchions on the same side of the loading bay are rigidly connected together at their upper portions, and this rigid connection desirably is effected by a hollow steel tubular extrusion. The opposing carrier stanchions on opposite sides of the bay are rigidly connected together at their upper portions, and this rigid connection desirably is effected by a steel I-beam.

Each trailer bay of the loading dock is provided with a driver control panel and an operator control panel. Each of these respective control panels desirably is mounted on its own column that is vertically extending above the ground and respectively situated so that either the truck driver can manipulate the driver control panel form the truck cab or the forklift operator can manipulate the operator control panel from the loading dock while sitting in the forklift truck. These control panels desirably are electrically connected so as to control the hydraulic motors that selectively raise and lower the barrier platforms as well as a barrier gate, a drop gate and side gates of stair units.

There desirably are three bumper support posts that desirably extend vertically above the ground but are much shorter than the carrier stanchions. Three such bumper support posts and two carrier stanchions desirably are spaced equally apart along the length of each of the longer sides of each loading bay.

Each barrier platform carries three spaced apart alignment collars, and each alignment collar is configured to receive therethrough one of the bumper support posts. Once the barrier platform nears the lowered position, each of the three alignment collars aligns itself to receive the upper end of a respective one of these three bumper support posts through the respective alignment collar.

Each alignment collar desirably has a plurality of high-strength compression springs mounted so as to allow each alignment collar to absorb about two inches of compression to slow the forklift to a stop if the forklift were to run into the bumper that is carried on the barrier platform. These three bumper support posts give the barrier platforms added support and strength to absorb the blow of a forklift running into the bumper on the inner rail of the barrier platform.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in this specification, including reference to the accompanying figures, in which:

FIG. 3 is top plan view of more than one embodiment of the forklift fall protection unit of FIG. 2 installed alongside each other.

FIG. 4 is a side plan view taken along the lines of sight designated 4-4 in FIG. 3.

FIG. 6 is a rear plan view of selected components and taken along the lines of sight generally designated 6-6 in FIG. 3.

FIG. 7 is a rear plan view of selected components and taken along the lines of sight generally designated 7-7 in FIG. 3.

FIG. 9 is a plan view of selected components and taken along the lines of sight generally designated 9-9 in FIG. 3 and showing both a first operative mode and a second operative mode.

FIG. 10 is a plan view of selected components and taken along the lines of sight generally designated 10-10 in FIG. 3 and showing both a first operative mode and a second operative mode.

Figure 1:
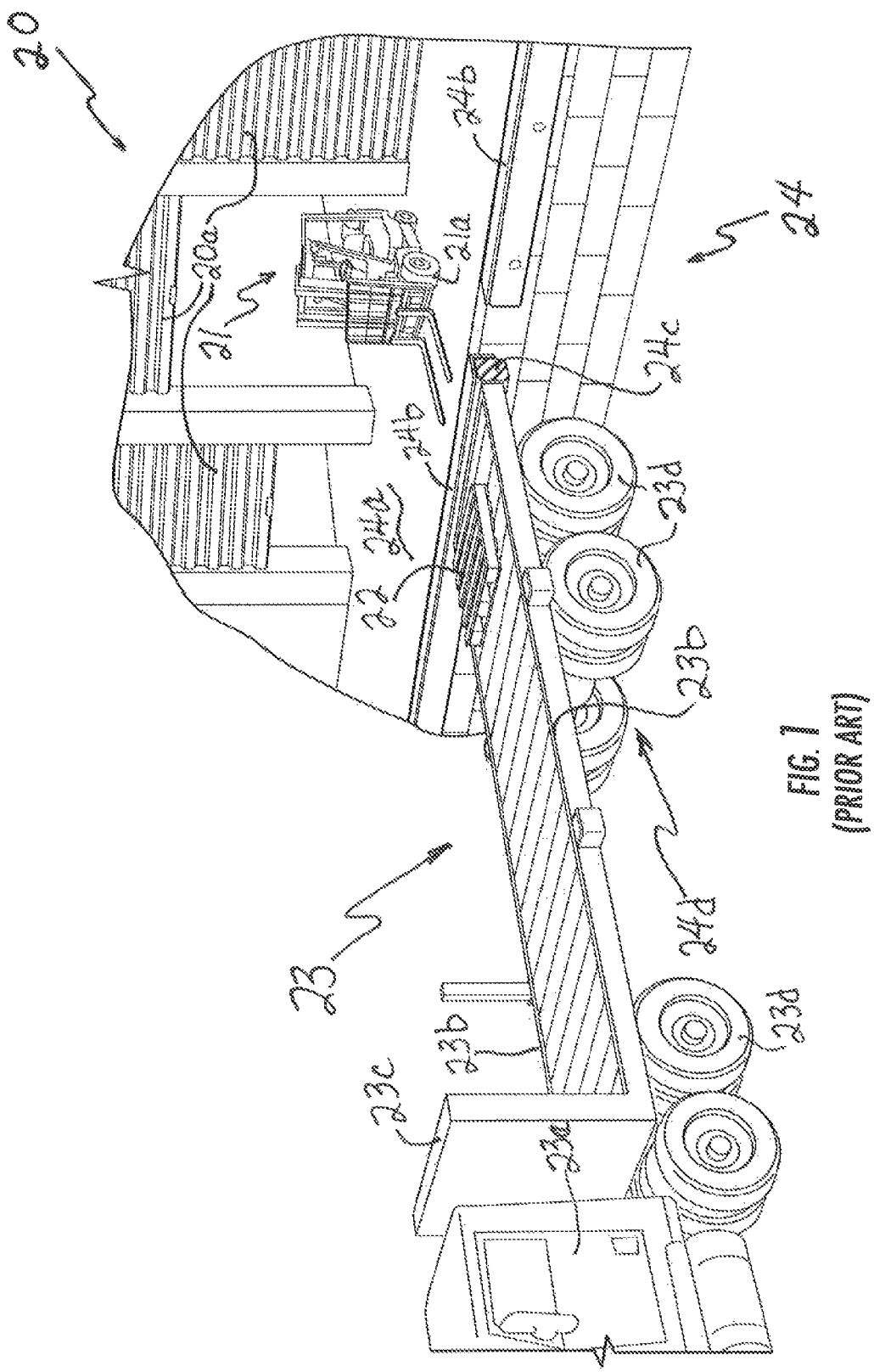
FIG. 1 is an elevated perspective view of a typical warehouse environment.

The accompanying drawings, which are incorporated in and constitute a part of this specification, illustrate at least one presently preferred embodiment of the invention as well as some alternative embodiments. These drawings, together with the written description, serve to explain the principles of the invention but by no means are intended to be exhaustive of all of the possible manifestations of the invention.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

It is to be understood that the ranges and limits mentioned herein include all sub-ranges located within the prescribed limits, inclusive of the limits themselves unless otherwise stated. For instance, a range from 100 to 200 also includes all possible sub-ranges, examples of which are from 100 to 150, 170 to 190, 153 to 162, 145.3 to 149.6, and 187 to 200. Further, a limit of up to 7 also includes a limit of up to 5, up to 3, and up to 4.5, as well as all sub-ranges within the limit, such as from about 0 to 5, which includes 0 and includes 5 and from 5.2 to 7, which includes 5.2 and includes 7.

Figure 2:
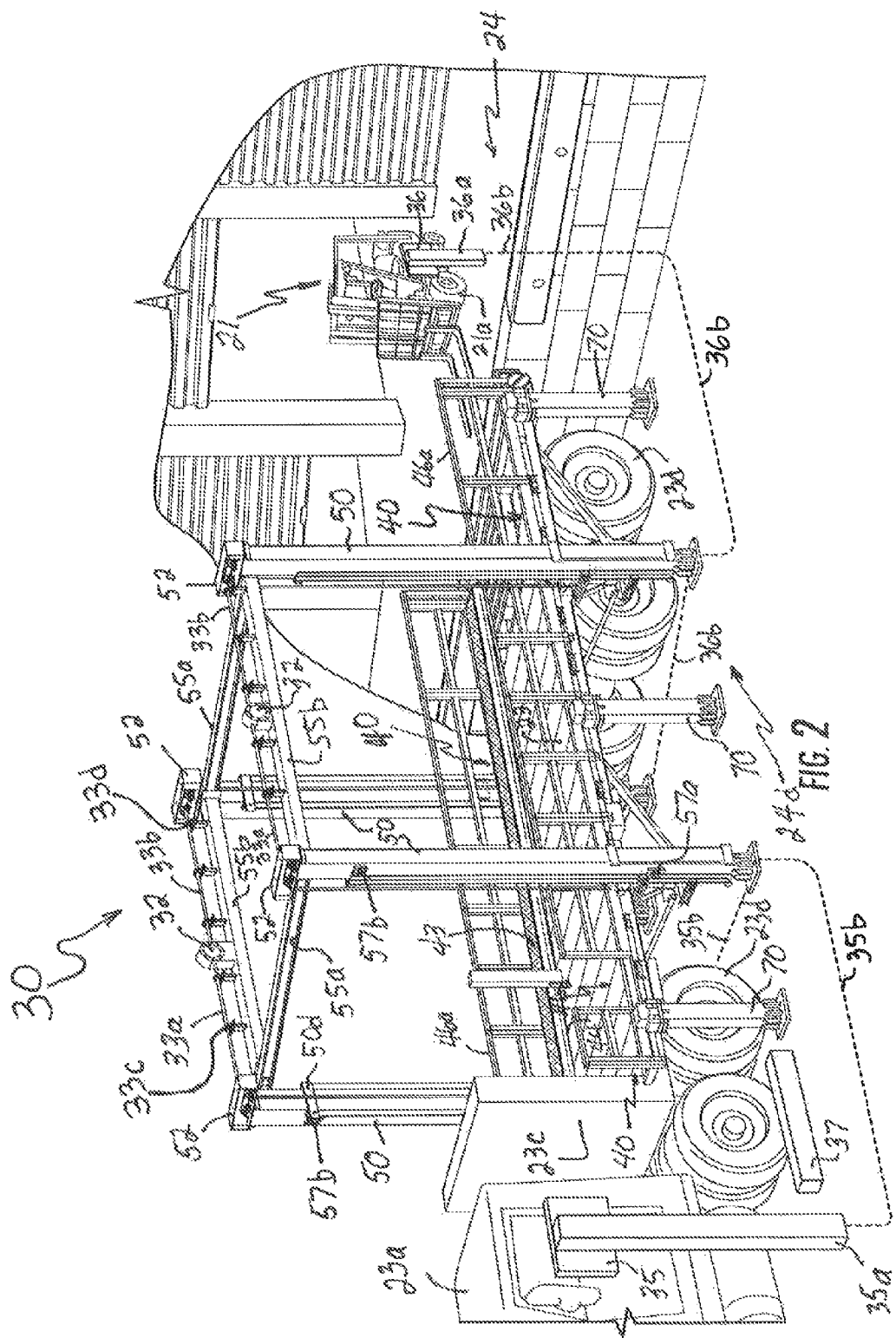
FIG. 2 is an elevated perspective view of an embodiment of a forklift fall protection unit of the present invention.

One embodiment of the forklift fall protection unit of the present invention is depicted in FIG. 2 and indicated generally by the numeral 30. This example of an embodiment of a forklift fall protection unit 30 is shown for only a single bay 24d of a loading dock 24 in order to eliminate undue complexity in the drawing. However, FIG. 3 shows a loading dock arrangement with more than one loading bay 24d, and a separate embodiment of a forklift fall protection unit 30 can be provided for each bay 24d of the loading dock 24. As shown in FIG. 3 for example, there desirably are the tire rub rails 37 at the entrance of each of the two loading bays 24d. As shown in FIG. 2, FIG. 6 and FIG. 7 for example, these tire rub rails 37 are configured and disposed to either side of the tires of the flatbed trailer 23 and cab 23a in order to help the truck driver back the flatbed trailer 23 and cab 23a into the loading bay 24d.

Briefly, as schematically shown in FIG. 2 for example, the forklift fall protection unit 30 desirably can include a pair of barrier platforms 40, a pair of carrier stanchions 50 for each of the barrier platforms 40, a motor 32 (typically including a gear box) for each of the barrier platforms 40, and a pair of main drive carriages 60 that slidably connect each pair of carrier stanchions 50 to one of the two barrier platforms 40. Thus, there is a one-to-one correspondence between each respective main drive carriage 60 and one of the carrier stanchions 50.

As shown in FIG. 2, FIG. 3 and FIG. 4 for example, a forklift fall protection unit 30 desirably can include a first barrier platform 40 that is disposed on a first side of the loading bay 24d. Similarly, as shown in FIG. 2 and FIG. 3 for example, the forklift fall protection unit 30 desirably can include a second barrier platform 40 that is disposed on a second side of the loading bay 24d opposite the first side of the loading bay 24d. The two barrier platforms 40 are spaced apart from each other sufficiently so that a flatbed trailer 23 can be fit in between the two barrier platforms 40. Each of the two barrier platforms 40 has a far greater length dimension than width dimension. In one embodiment of the forklift fall protection unit 30, each barrier platform 40 desirably has a length of 44 feet, which corresponds to one of the standard lengths of flatbed trailers 23 currently in use. In another embodiment of the forklift fall protection unit 30, each barrier platform 40 desirably has a length of 53 feet, which corresponds to another one of the standard lengths of flatbed trailers 23 currently in use. In this way, each of the long sides of the flatbed trailer 23 that is backed into the loading bay 24d will be guarded by one of the barrier platforms 40.

As shown in FIG. 3A, FIG. 3B, FIG. 4A and FIG. 10B for example, each barrier platform 40 desirably includes an inner rail 41a and an outer rail 41b. Desirably, each of the inner rail 41a and the outer rail 41b desirably is formed of hollow steel extrusion having a square, transverse cross-sectional shape measuring about four inches on each side of the square. Each of the inner rail 41a and the outer rail 41b elongates down the length of the respective barrier platform 40 in directions so that the rails 41a, 41b are parallel to one another. The span between the rails 41a, 41b determines the width of the barrier platform 40 and desirably measures about two and one half feet between the free outer surface of the inner rail 41a and the free outer surface of the outer rail 41b.

Figure 3A:
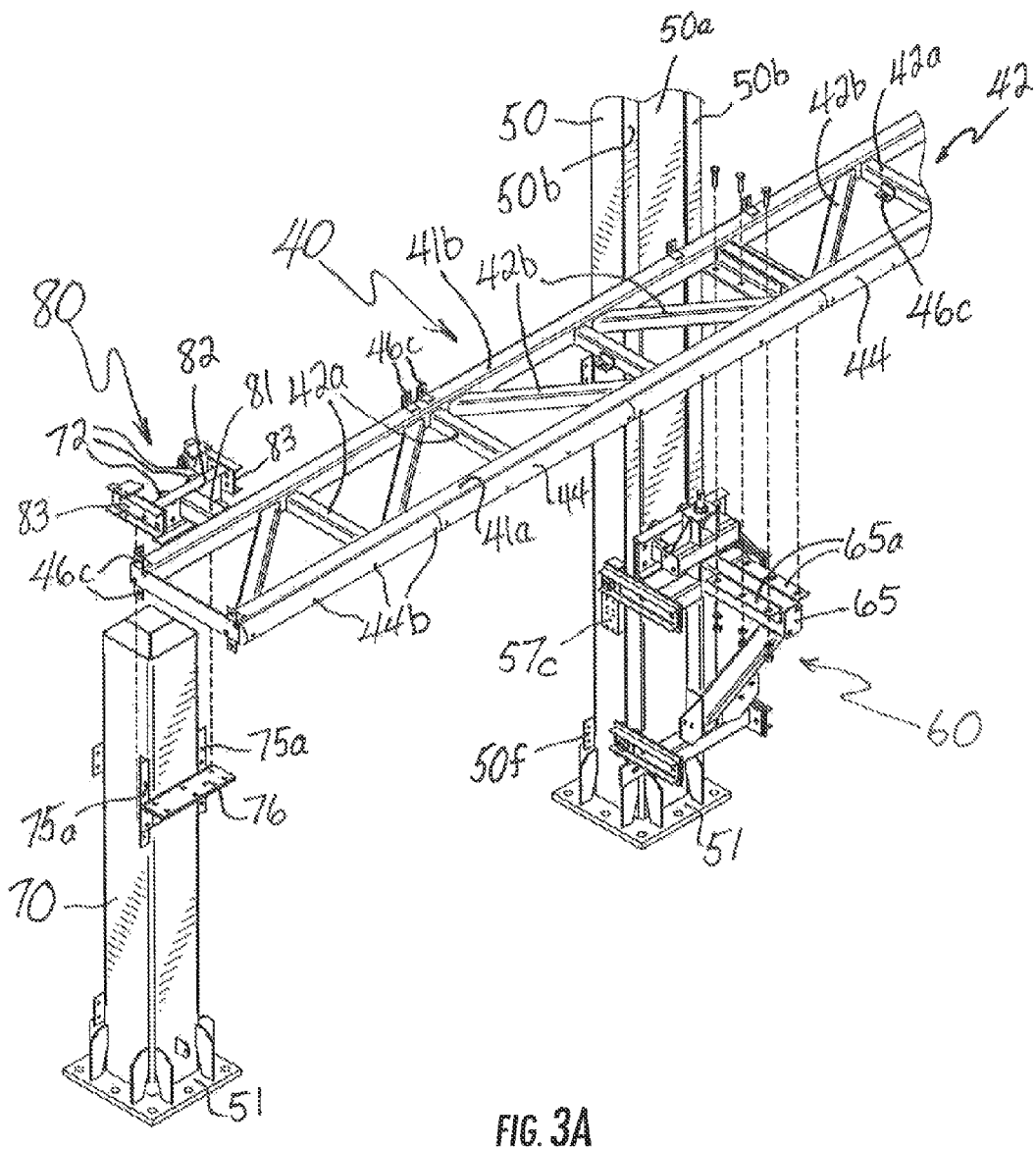
FIG. 3A is an enlarged elevated perspective view of selected components of the detail designated 3A in FIG. 3.

As shown in FIG. 3A for example, each barrier platform 40 desirably includes a plurality of cross braces 42a, 42b which desirably are connected to and extend between the inner rail 41a and the outer rail 41b. Each of the cross braces 42a, 42b desirably has one of its opposite ends connected, desirably by welding, to the inner rail 41a and the other one of its opposite ends connected, desirably by welding, to the outer rail 41b. As shown in FIG. 3A for example, some of the cross braces 42a elongate in a direction that is normal to the direction of elongation of the inner rail 41a and the outer rail 41b, and some of the cross braces 42b desirably elongate in a direction that is at an angle other than 90 degrees to the direction of elongation of the inner rail 41a and the outer rail 41b. Each of cross braces 42a, 42b desirably is formed of hollow steel extrusion having a square, transverse cross-sectional shape measuring about three inches on each side of the square.

Each of the barrier platforms is configured to provide a level surface suitable to permit personnel to walk on the level surface and access from the level surface a flatbed trailer received in the loading bay. As shown in FIG. 2, FIG. 3, FIG. 3B, FIG. 4A and FIG. 10B for example, each barrier platform 40 desirably includes a walkway, which desirably is formed at least in part by a bar grating 43 that desirably measures about one half inch thick and has a width that extends between the inner rail 41a and the outer rail 41b and a length that extends for the length of the barrier platform 40 and thus the length of the inner rail 41a and the outer rail 41b. The upper surface of the bar grating 43 is flat and provides a level surface on which personnel can walk. Moreover, personnel standing on the bar grating 43 also can access a flatbed trailer 23 that is received in the loading bay 24d. The bar grating 43 can be formed in sections that when placed end-to-end extend for the full length of the barrier platform 40. The bar grating 43 desirably is disposed on top of and attached, as by welding for example, to the cross braces 42a, 42b disposed between the inner rail 41a and the outer rail 41b. The cross braces 42a, 42b serve to support the bar grating 43 as well as to strengthen the barrier platform 40 from side impacts against the inner rail 41a directed toward the outer rail 41b.

Figure 10A:
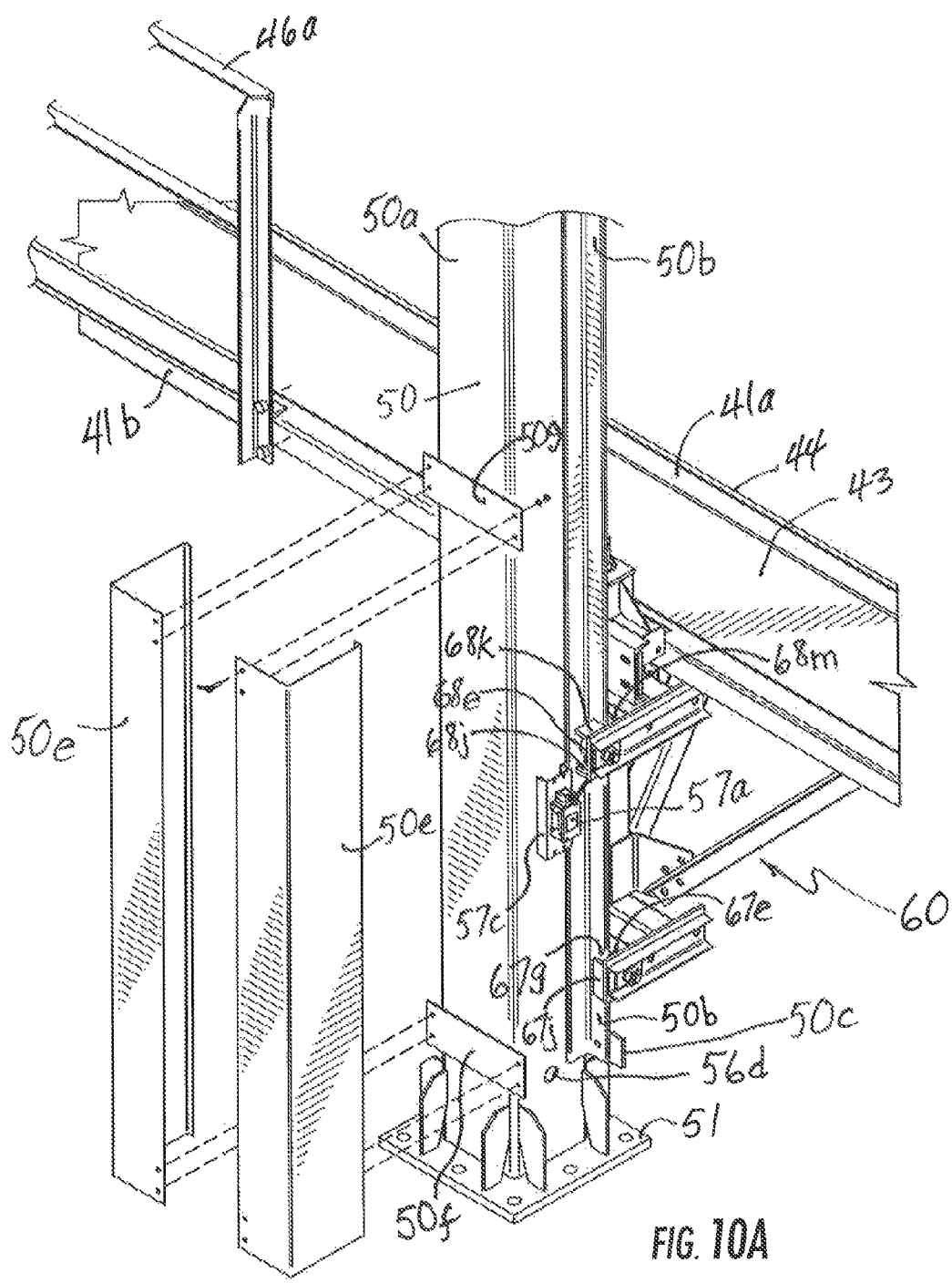
FIG. 10A is an elevated perspective detail view of selected components of a portion of a carrier stanchion and barrier platform of a fall protection unit of the present invention taken generally in the region indicated by the arrows of the chain-dashed line pointing to the designation 10A in FIG. 10.
Figure 10B:
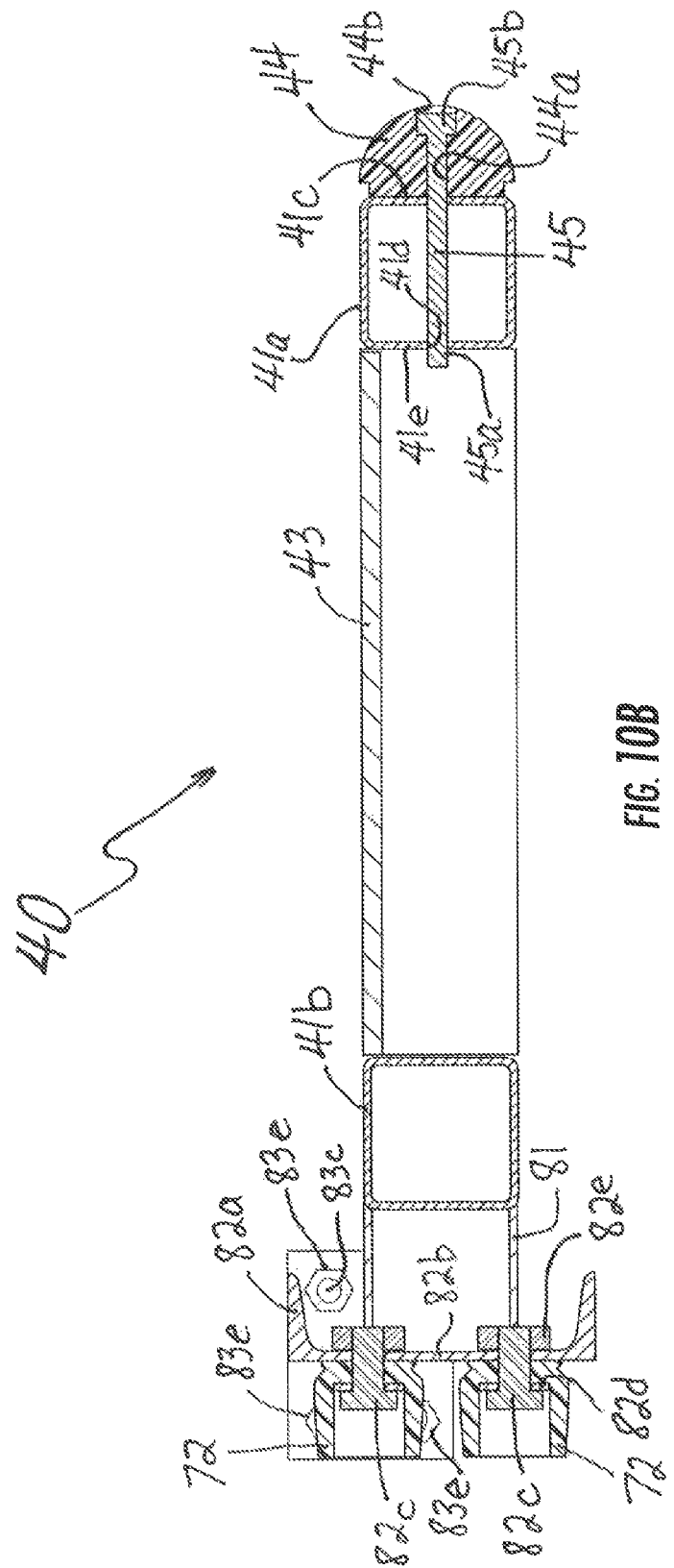
FIG. 10B is a cross-sectional view of components of a portion of a barrier platform taken along the lines of sight generally designated 10B-10B in FIG. 3B.

As shown in FIG. 10B for example, the free edge of the walkway terminates in the free outer side 41c of the inner rail 41a that carries and is connected to a flat surface of a forklift rub rail 44, which desirably is formed from a hard, slippery plastic material such as ultra high molecular weight (UHMW) polyethylene. A forklift rub rail 44 desirably is carried by each barrier platform 40 and desirably is configured and disposed so that the forklift rub rail 44 will be disposed as the first point of contact between the barrier platform 44 and any forklift truck 21 that approaches the barrier platform 44. Each forklift rub rail 44 desirably is configured to extend along substantially the entire length of the respective barrier platform 40 and disposed facing the opposing barrier platform 40. A plurality of bolts 45 spaced apart along the length of each barrier platform 40 secures each entire forklift rub rail 44 to its respective barrier platform 40. In the transverse cross-sectional view of the forklift rub rail 44 depicted in FIG. 10B for example, the forklift rub rail 44 desirably is secured to the free outer side 41c of the inner rail 41a of the barrier platform 40 by a bolt 45 that extends through a respective hole 44a formed transversely through the forklift rub rail 44 and has a threaded free end 45a that screws into a threaded hole defined through the inner side 41e of the inner rail 41a of the barrier platform 40. As shown in FIG. 3A for example, the head 45b of each bolt 45 desirably is received in a respective countersunk recess 44b formed in the convex side of the forklift rub rail 44. As shown in FIG. 10B for example, the bolt 45 includes an elongated shaft that extends between the threaded free end 45a and the head 45b and desirably passes through the forklift rub rail 44 and the inner rail 41a of the barrier platform 40 before the threaded free end 45a screws into a threaded hole 41d that desirably is formed through the inner side 41e of the inner rail 41a.

As shown in FIG. 3 for example, a first forklift rub rail 44 is carried by the first barrier platform 40 and extends along substantially the entire length of the first barrier platform 40 and is disposed facing the second barrier platform 40. Similarly, a second forklift rub rail 44 is carried by the second barrier platform 40 and extends along substantially the entire length of the second barrier platform 40 and is disposed facing the first barrier platform 40.

As shown in FIG. 2 and FIG. 3 for example, the walkway of each barrier platform 40 extends lengthwise for the length of the barrier platform 40 and widthwise having a free edge facing in the direction where the nearest side edge 23b (FIG. 2) of the flatbed trailer 23 would be located. As shown in FIG. 2 and FIG. 3 for example, when the barrier platform 40 is deployed in the operative orientation, the bar grating 43 desirably will be disposed just above the height of the working surface of the flatbed trailer 23. Thus, the walkway of the barrier platform 40 is configured so that workers standing on the bar grating 43 easily can step onto the flatbed trailer 23 as well as have access to the side of the flatbed trailer 23 without having to step onto the flatbed trailer 23.

As shown in FIG. 2 and FIG. 3 for example, the forklift rub rail 44 is disposed toward the interior of the loading bay 24d where the flatbed trailer 23 would be parked for loading or unloading. As shown in FIG. 2 and FIG. 3 for example, the barrier platform 40 and its forklift rub rail 44 desirably are configured so that the forklift rub rail 44 projects just past the nearest side edge 23b of the flatbed trailer 23 and thus extends slightly over the side edge 23b and hovers over the working surface of the flatbed trailer 23. However, as shown in FIG. 6, FIG. 7, FIG. 8B, FIG. 9 and FIG. 10 for example, depending on such factors as the width of the flatbed truck 23 and the way it is parked in the loading bay 24d, the forklift rub rail 44 can project as much as 6 inches over the side edge 23b or can fall about 6 inches short of reaching the side edge 23b of the flatbed truck 23. Nonetheless, the dimensions of the forklift truck 21 ensure that the forklift truck 21 will contact the forklift rub rail 44 before the wheels 21a of the forklift truck 21 will roll past the side edge 23b of the flatbed trailer 23. Moreover, because the forklift rub rail 44 desirably is formed from a hard, slippery plastic material such as ultra high molecular weight polyethylene (UHMW), the forklift truck 21 likely will tend to strike a glancing blow to the forklift rub rail 44 unless the forklift truck 21 hits the forklift rub rail 44 squarely head-on.

Figure 3B:
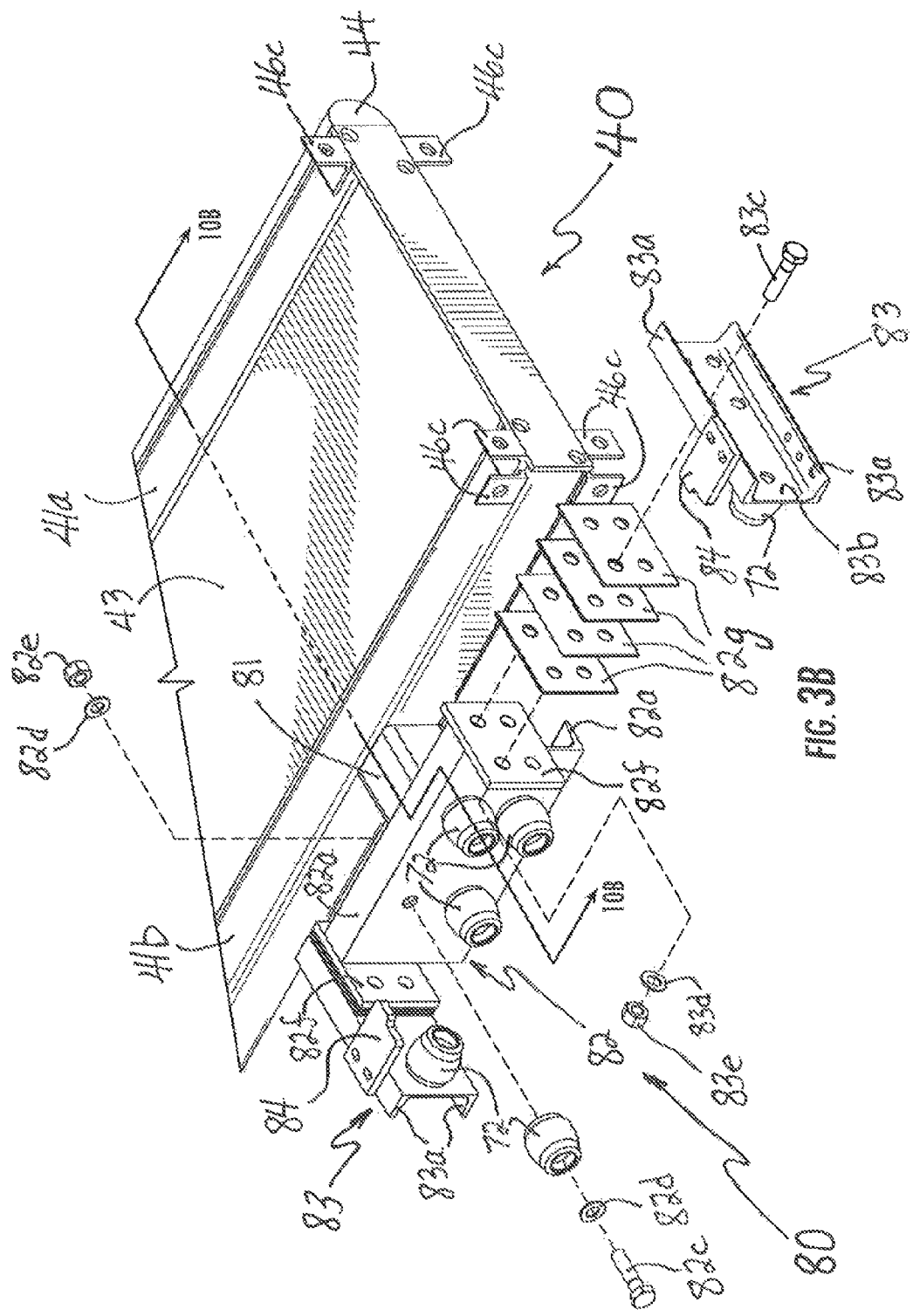
FIG. 3B is an enlarged, elevated perspective view of components of the barrier platform.
Figure 4A:
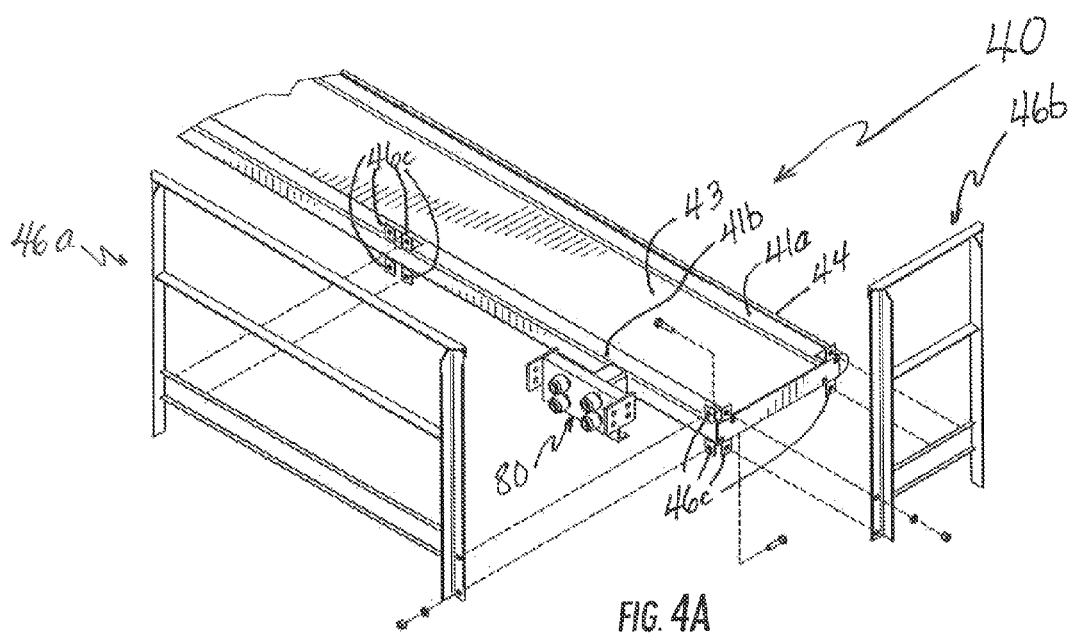
FIG. 4A is an elevated perspective view of components of the barrier platform.

As shown in FIG. 4A for example, on the side edge opposite the side edge of the barrier platform 40 carrying the forklift rub rail 44, each barrier platform 40 desirably supports a fence that extends along the length of the barrier platform 40 and is composed of fence segments 46a that rise vertically above the bar grating 43 as shown in FIG. 2 for example. At each of the respective opposite ends of the barrier platform 40, a respective separate guard railing segment 46b desirably rises vertically above the bar grating 43 and extends across the width of the barrier platform 40. As shown in FIG. 3A, FIG. 3B and FIG. 4A for example, a plurality of anchor clips 46c desirably is provided so that threaded bolts, threaded nuts and washers can be used to attach the fence segments 46a to the outer rail 41b and the guard railing segments 46b to the inner rail 41a and the outer rail 41b of the barrier platform 40.

Figure 5:
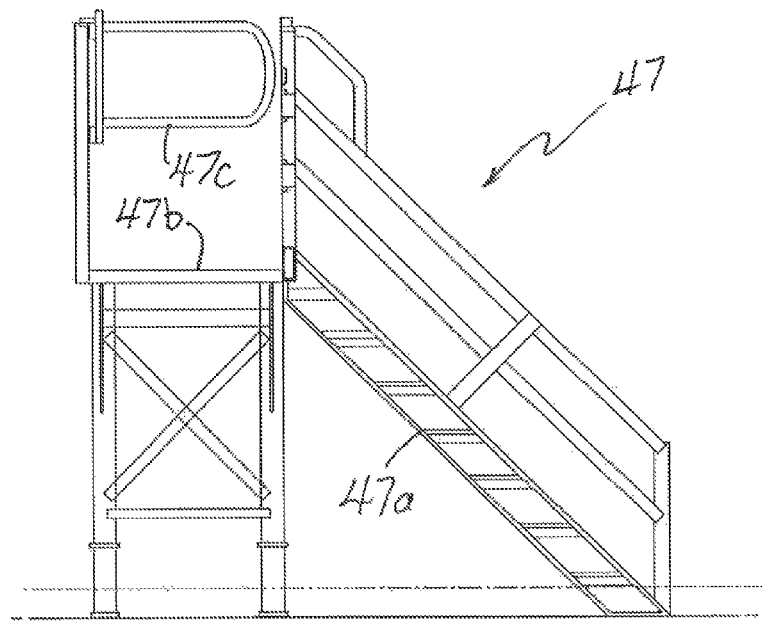
FIG. 5 is a side plan view of selected components and taken along the lines of sight generally designated 5-5 in FIG. 3.

As shown in FIG. 2 and FIG. 4 for example, near the end of the barrier platform 40 located farther from the loading dock 24, there is a gap 46d between adjacent fence segments 46a. FIG. 5 shows a side view of a stair unit 47 (also shown from above in FIG. 3) that desirably is positioned between two loading bays 24d and at the end where the cab 23a of the flatbed trailer 23 would be connected to the trailer 23. As shown in FIG. 3 and FIG. 5 for example, the stair unit 47 includes a stairway 47a that ascends from the ground to a platform 47b. Access from either side of the platform 47b is limited by a respective side gate 47c, which is selectively locked in the position shown in FIG. 5 or unlocked as schematically shown for one of the side gates 47c depicted in FIG. 3. The stair unit 47 desirably is positioned so that each respective side gate 47c aligns with the respective gap 46d between adjacent fence segments 46a of the respective barrier platform 40 when the respective barrier platform 40 is lowered into its operative position such as shown in FIG. 2 and FIG. 4 for example. In this way, when the side gate 47c of the stair unit 47 is unlocked, the driver could leave the cab 23a of the flatbed trailer 23, ascend the stairway 47a to the platform 47b and walk onto the barrier platform 40 via the unlocked side gate 47c and the gap 46d between the fence segments 46a, thereby gaining access to the barrier platform 40 from the front of the flatbed trailer 23.

As shown in FIG. 2 and FIG. 4 for example, each barrier platform 40 is carried by two vertically extending carrier stanchions 50, which desirably are spaced apart from each other by about 20 feet along the lengthwise direction of the loading bay 24d. As shown in FIG. 2 and FIG. 3 for example, a first pair of carrier stanchions 50 is disposed to the first side of the loading bay 24d and is configured and disposed for carrying the first barrier platform 40. Similarly, a second pair of carrier stanchions 50 is disposed to the second side of the loading bay 24d and is configured and disposed for carrying the second barrier platform 40.

Figure 11A:
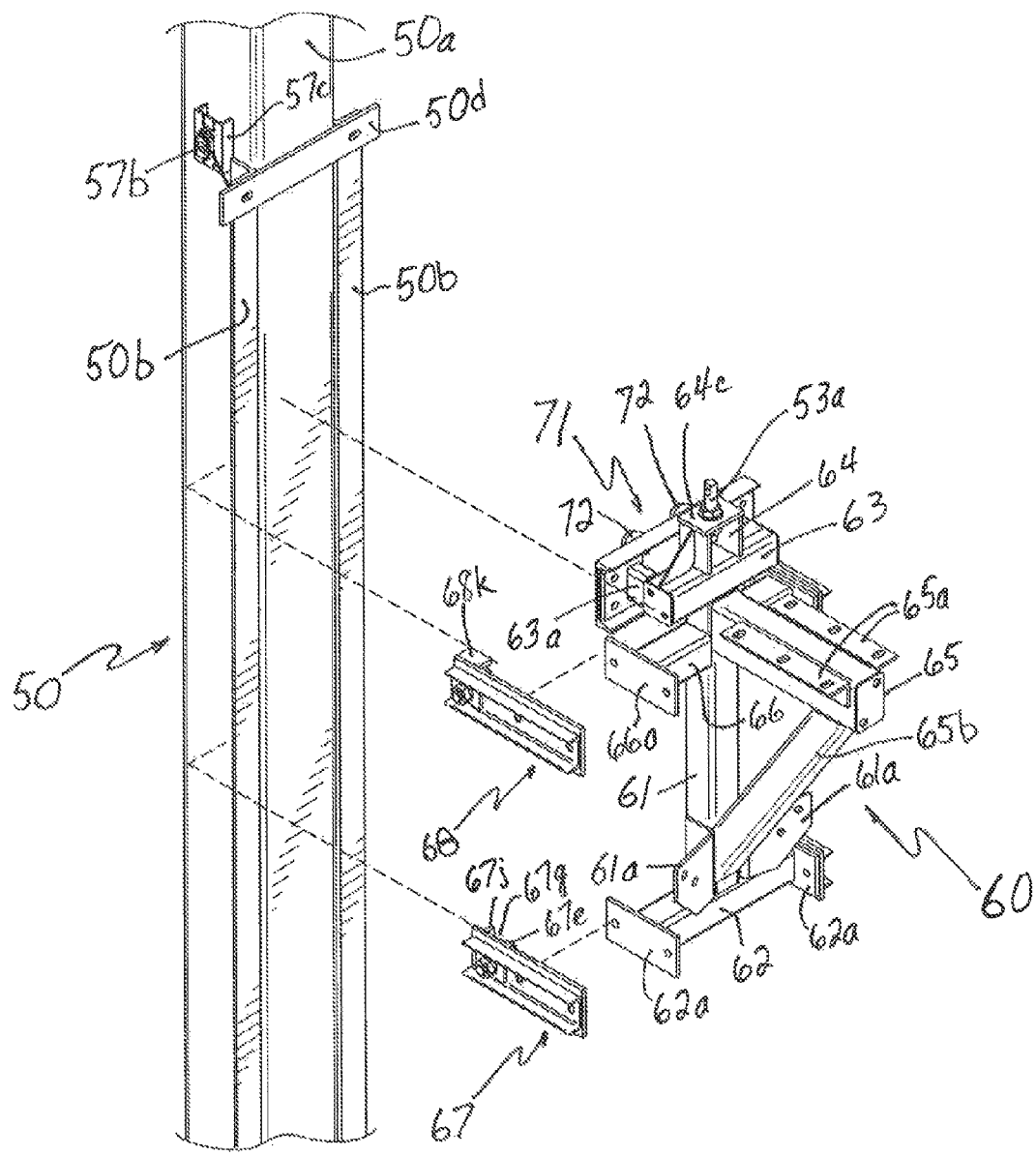
FIG. 11A is an elevated perspective detail view of components of a portion of a carrier stanchion and main drive carriage of a fall protection unit of the present invention.

As shown in FIG. 3A and FIG. 10A for example, each carrier stanchion 50 is anchored at the bottom thereof by a foot 51 in the form of a flat metal plate, which rests on the ground and desirably can be bolted to a concrete pad (not shown). As shown in FIG. 3A, FIG. 4, FIG. 10A and FIG. 11A for example, each carrier stanchion 50 desirably includes a hollow metal support tube 50a, which desirably has a length such that the top stands about 22 feet above the ground when the carrier stanchion 50 measured from the foot 51. The hollow support tube 50a of the carrier stanchion 50 includes a respective guide track 50b extending outwardly from each respective opposite side and along the length of the exterior surface of the hollow support tube 50a of the carrier stanchion 50. As shown in FIG. 3A and FIG. 10A for example, each guide track 50b begins just above the foot 51 and elongates towards the upper end of the hollow support tube 50a for most of the length of the hollow support tube 50a. As shown in FIG. 10A for example, a metal strip fixed transversely across the guide tracks 50b near the foot 51 forms a lower stop 50c. As shown in FIG. 11A for example, another metal strip fixed transversely across the guide tracks 50b near the upper end of the hollow support tube 50a forms an upper stop 50d. As explained more fully below, each of the stops 50c, 50d serves to prevent further travel of the main drive carriage 60 along the guide tracks 50b.

Figure 13:
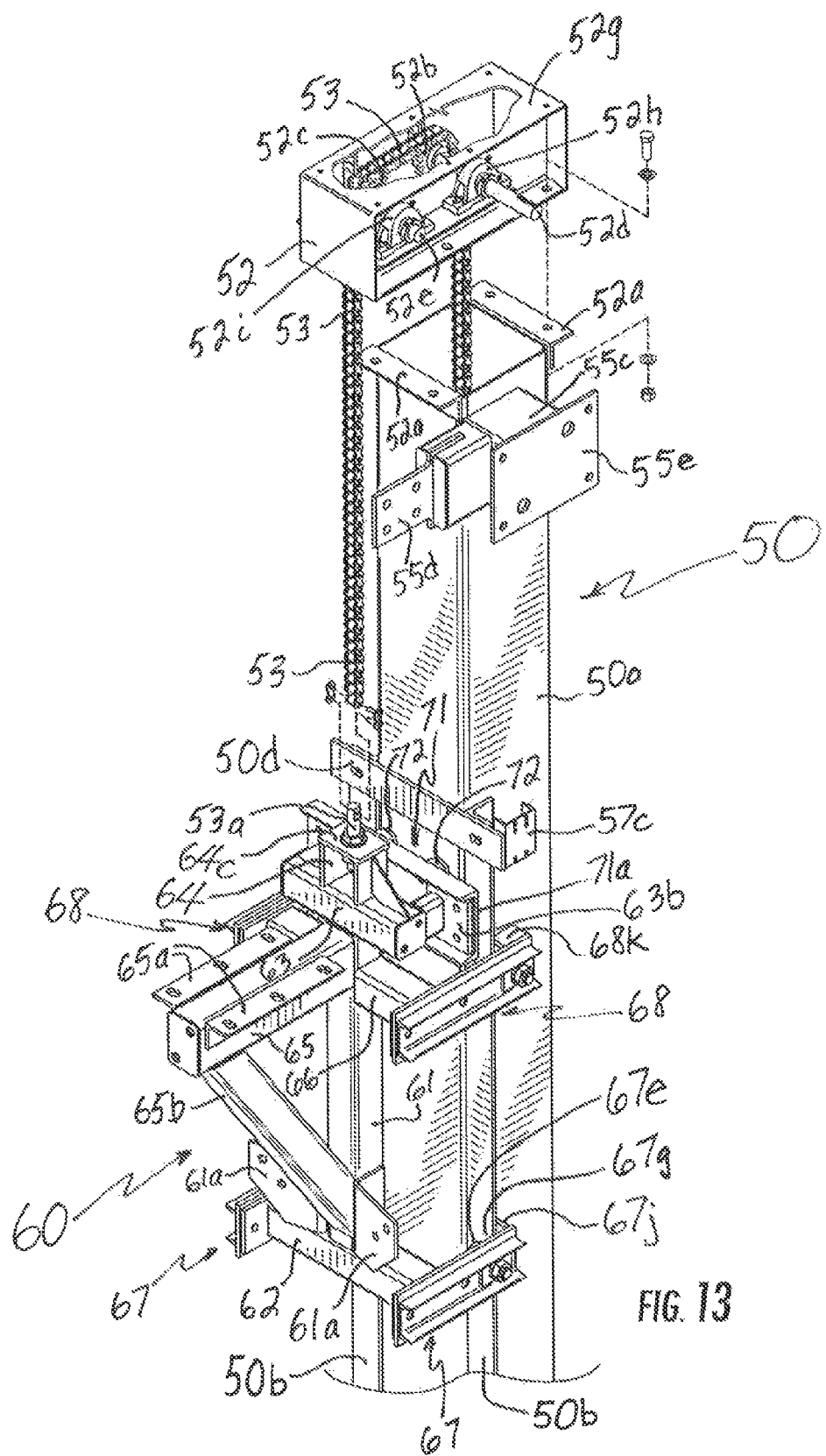
FIG. 13 is an elevated perspective detail view of partially assembled selected components of a portion of a carrier stanchion and main drive carriage of a fall protection unit of the present invention.
Figure 15:
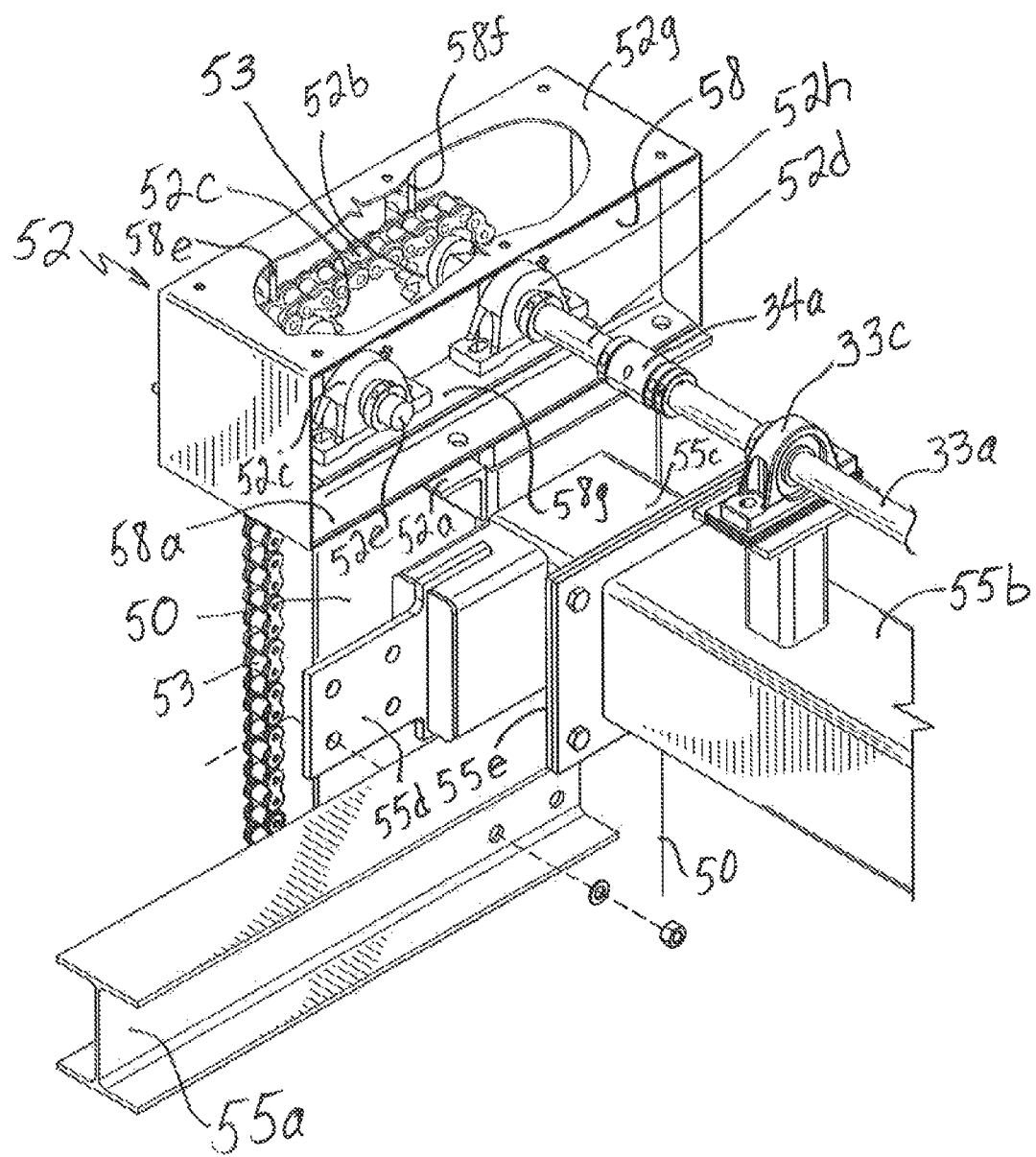
FIG. 15 is an elevated perspective view of embodiments of selected components of a sprocket housing assembly atop a carrier stanchion with partially disassembled cross beam of a fall protection unit of the present invention.

As shown in FIG. 2 and FIG. 3 for example, opposing carrier stanchions 50 on opposite sides of the loading bay 24d are rigidly connected together at their upper portions, and this rigid connection desirably is effected by a cross beam 55a, which desirably is configured as a steel I-beam. Similarly, as shown in FIG. 2, FIG. 3 and FIG. 4 for example, opposing carrier stanchions 50 on the same side of the loading bay 24d are rigidly connected together at their upper portions, and this rigid connection desirably is effected by a side extrusion 55b, which desirably is configured as a hollow steel tube having a square transverse cross-section. As shown in FIG. 13 and FIG. 15 for example, an attachment fixture 55c is connected, as by welding, to the upper portion of each carrier stanchion 50 and desirably is provided with a first attachment flange 55d for connecting with one end of the cross beam 55a and a second attachment flange 55e for connecting with one end of the side extrusion 55b. However, the barrier platform 40 on one side of the loading bay 24d is not connected structurally to the barrier platform 40 on the opposite side of the loading bay 24d. Thus, the barrier platform 40 on one side of the loading bay 24d is not structurally integral with the barrier platform 40 on the opposite side of the loading bay 24d.

As shown in FIG. 2, FIG. 4, FIG. 12, FIG. 13 and FIG. 15 for example, a sprocket housing 52 is carried atop each support tube 50a of each carrier stanchion 50. As shown in FIG. 13 for example, the upper free end of the support tube 50a of each carrier stanchion 50 desirably is straddled by a pair of mounting flanges 52a to which the sprocket housing 52 desirably is bolted. The mounting flanges 52a desirably are welded to the upper free end of the support tube 50a, but can be bolted thereto if desired. Each of the carrier stanchions 50 extends vertically above the loading bay 24d and desirably rises about 23 feet above the foot 51 to the very top of the sprocket housing 52 of the carrier stanchion 50.

Figure 12:
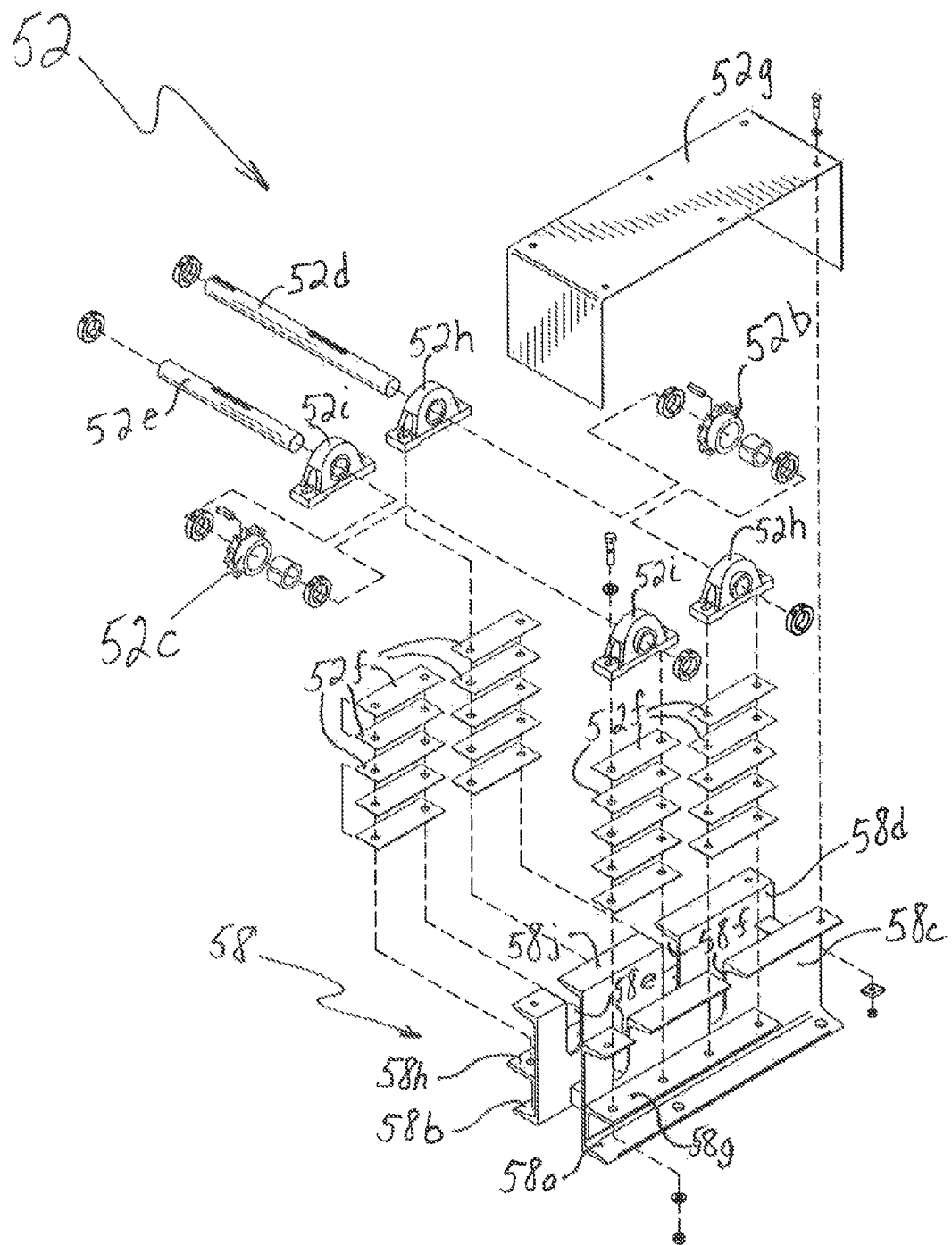
FIG. 12 is an elevated perspective view of embodiments of selected disassembled components of a sprocket housing assembly of a fall protection unit of the present invention.

As shown in FIG. 12 for example, each sprocket housing 52 desirably shelters a drive sprocket 52b and an idler sprocket 52c rotatably mounted at the top of each of the four carrier stanchions 50 and aligned with each other. Each respective sprocket 52b, 52c desirably is rigidly attached about a respective drive sprocket rod 52d and a respective idler sprocket rod 52e so that each respective rod 52d, 52e and sprocket 52b, 52c rotate as one. As shown in FIG. 12 for example, each of the respective opposite ends of each of the drive sprocket rods 52d is rotatably held in a respective drive sprocket bearing 52h. Similarly, each of the respective opposite ends of each of the idler sprocket rods 52e is rotatably held in a respective idler sprocket bearing 52i. As shown in FIG. 12 for example, a sprocket chassis 58 is disposed in the sprocket housing 52 and includes a pair of opposing and spaced apart base flanges 58a, 58b. As shown in FIG. 15 for example, the base flanges 58a, 58b desirably are attached, as by threaded bolts (not shown), threaded nuts (not shown) and washers (not shown), to the mounting flanges 52a at the upper free end of the support tube 50a forming the carrier stanchion 50. Such attachment also can be effected as by welding for example.

As shown in FIG. 12 for example, the sprocket chassis 58 desirably includes a pair of opposing and spaced apart side panels 58c, 58d. Each of these side panels 58c, 58d defines a pair of side-by-side slots 58e, 58f that are open at the top, closed at the bottom and extend vertically therebetween. Each respective slot 58e, 58f of each respective side panel 58c, 58d receives a respective one of the sprocket rods 52d, 52e, which are free to rotate relative to the respective slots 58e, 58f of the sprocket chassis 58. The side-by-side slots 58e, 58f are accordingly spaced apart so that the respective sprockets 52b, 52c do not interfere with each other's rotation as each respective sprocket rod 52d, 52e rotates relative to the respective slot 58e, 58f of the sprocket chassis 58. Each respective sprocket 52b, 52c is disposed between the opposing side panels 58c, 58d of the sprocket chassis 58. A respective bearing mounting flange 58g, 58h is attached, as by welding for example, to a respective side panel 58c, 58d of the sprocket chassis 58. A respective pair of the drive sprocket bearings 52h and idler sprocket bearings 52i is carried by a respective one of the bearing mounting flanges 58g, 58h and attached thereto, as by threaded bolts, threaded nuts and washers for example. Moreover, one or more bearing shims 52f desirably can be inserted between a respective sprocket bearing 52h, 52i and a respective one of the bearing mounting flanges 58g, 58h in order to adjust the attitude of the rotational axis of the respective sprocket rod 52d, 52e. Each respective side panel 58c, 58d of the sprocket chassis 58 further includes a respective top flange 58*i*, 58*j* that is interrupted by a respective pair of side slots 58*e*, 58*f* and that desirably is attached, as by threaded bolts (not shown), threaded nuts (not shown) and washers (not shown) for example, to a cover plate 52*g* of the sprocket housing 52. Such attachment also can be effected as by welding for example.

Figure 14:
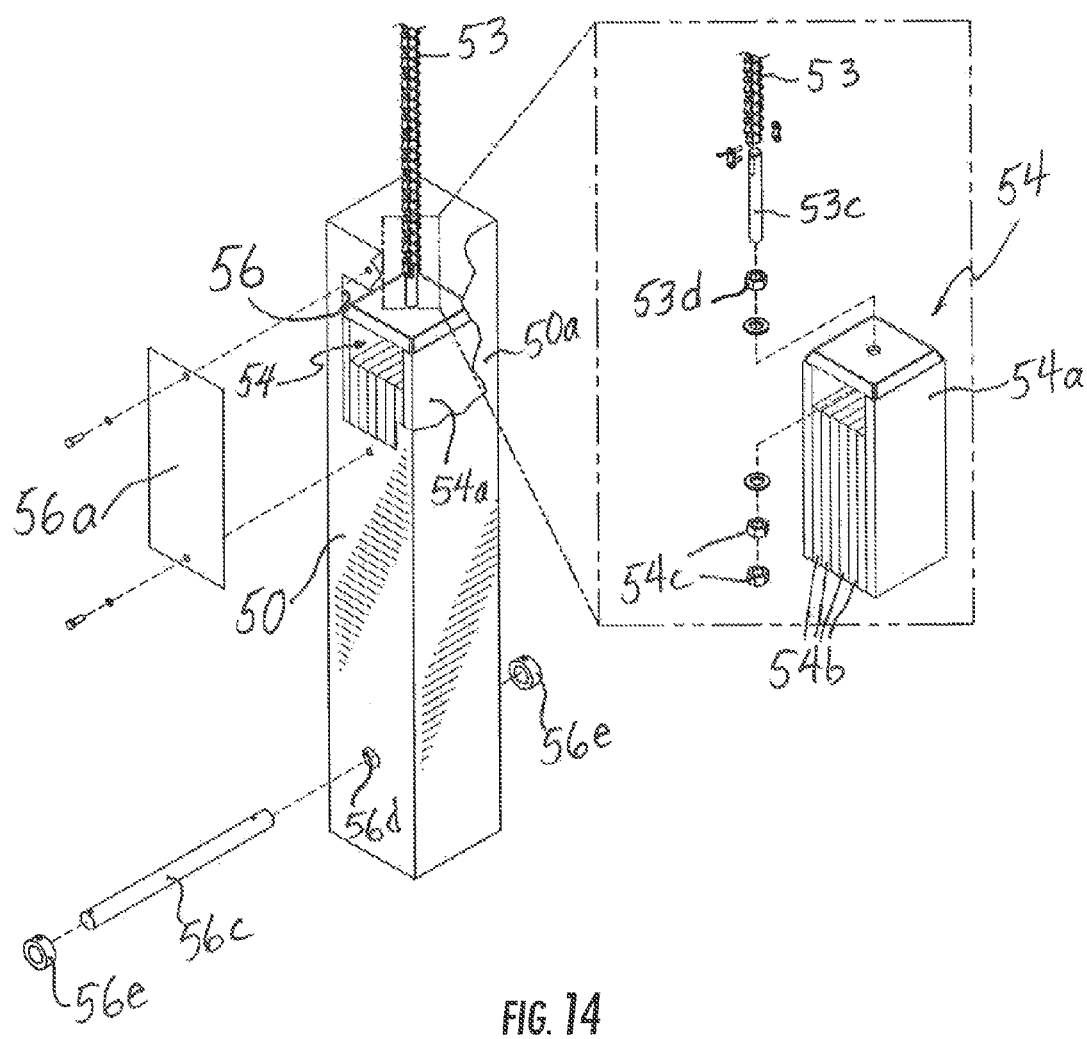
FIG. 14 is an elevated perspective detail view of partially assembled selected components of a portion of a carrier stanchion and counterweight and an enlarged view of the counterweight and chain of a fall protection unit of the present invention.

As shown in FIG. 13 for example, a chain 53 engages the drive sprocket 52*b* and the idler sprocket 52*c* (obscured from view in FIG. 13 by the cover plate 52*g* of the sprocket housing 52) so that rotation of the drive sprocket 52*b* moves the chain 53 in the direction of the rotation and thus moves the chain 53 either into or out of the hollow inner casing 50*a* of the carrier stanchion 50. The links of the chain 53 desirably are made of steel, and each link has opposite ends, and each opposite end of each link is pivotally connected to one of the opposite ends of its closest neighboring link. As explained more fully below, one end of the chain 53 is fixed to a main drive carriage 60 as shown in FIG. 13 for example, and the opposite end of the chain 53 is fixed to a counterweight 54 that is disposed inside the hollow inner casing 50*a* of the carrier stanchion 50 as shown in FIG. 14 for example. The motor 32 associated with the barrier platform 40 is connected so that operation of the motor 32 causes the sprocket drive rod 52*d* to rotate and so move the chain 53 in the direction of rotation of the drive sprocket 52*b* and idler sprocket 52*c*. Rotation of the drive sprocket 52*b* and idler sprocket 52*c* in one direction raises the associated barrier platform 40, while rotation of the drive sprocket 52*b* and idler sprocket 52*c* in the opposite direction lowers the associated barrier platform 40.

Figure 11B:
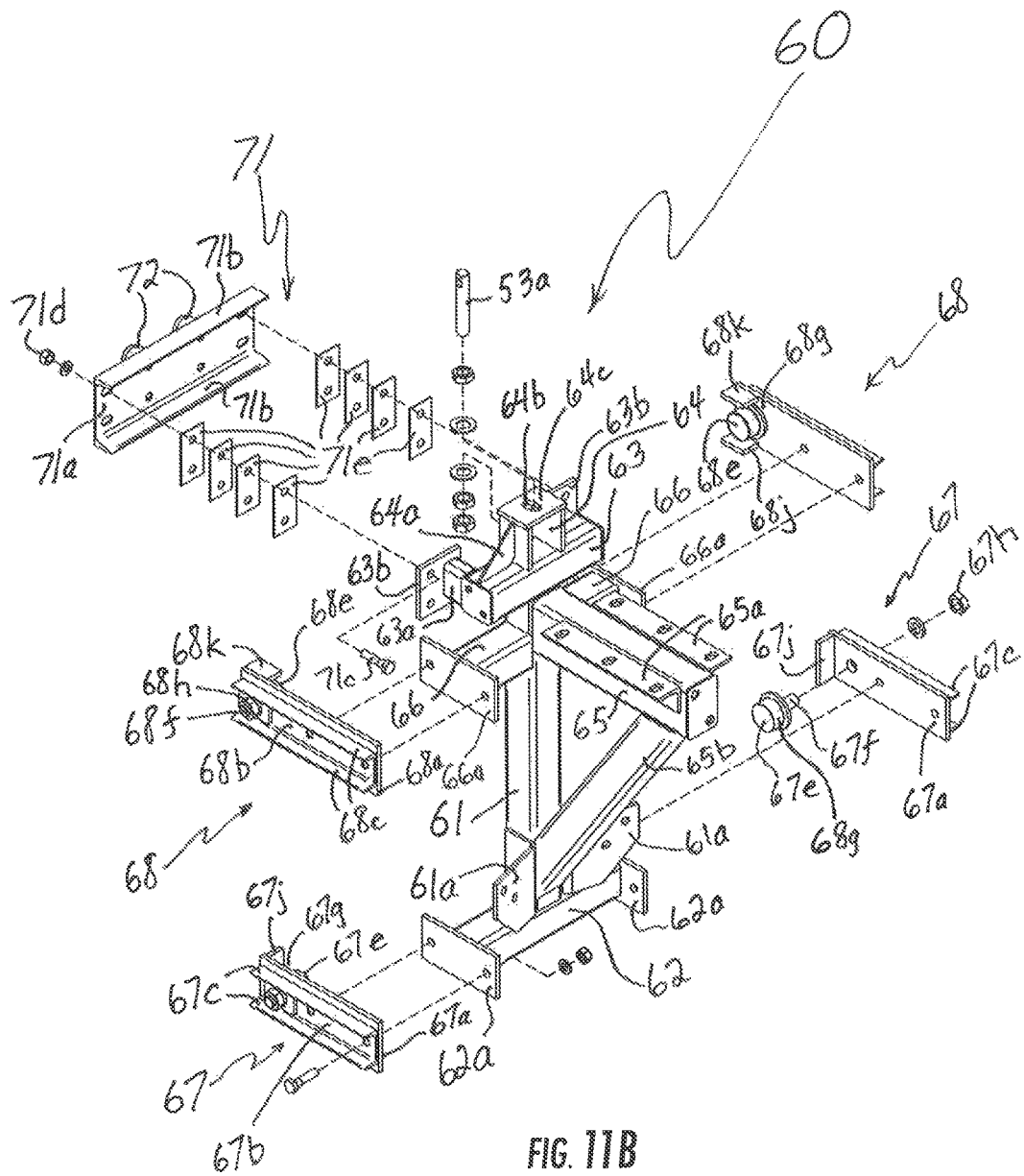
FIG. 11B is an elevated perspective view of embodiments of selected disassembled components of a main drive carriage of a fall protection unit of the present invention.

An elevated perspective view of an embodiment of a disassembled main drive carriage 60 is shown in FIG. 11B for example. Each such embodiment of a main drive carriage 60 desirably includes a main stem 61 having one end connected to a base 62 and an opposite end connected to a shoulder 63. A neck fixture 64 is attached to the shoulder 63. One end of a cantilever 65 is attached to the main stem 61 near the end of the main stem 61 where the shoulder 64 is attached and in between the shoulder 64 and where a pair of side wings 66 extend from the main stem 61.

The cantilever 65 desirably is formed by a hollow, straight steel tube having a square transverse cross-sectional shape and that elongates in a straight line in a direction that is normal to the straight line direction of elongation of the main stem 61. As shown in FIG. 11B for example, the cantilever 65 desirably is straddled on each opposite long side thereof by a right angle flange 65*a* that desirably has one of its legs welded (or otherwise mechanically attached) to the respective long side of the cantilever 65. As schematically indicated by the dashed lines in FIG. 3A for example, the other leg of each right angle flange 65*a* is bored to receive bolts that will attach a respective one of the barrier platforms 40 to the respective main drive carriage 60 via the cantilever 65 of the respective main drive carriage 60.

As shown in FIG. 11B for example, a main brace 65*b* desirably extends diagonally from beneath the free end of the cantilever 65 to the main stem 61 near where the base 62 connects to the one end of the main stem 61. The main brace 65*b* provides support to the cantilever 65 and thus to the barrier platform 40 resting on and connected to the main brace 65. Both the shoulder 63 and the cantilever 65 elongate in a direction that is normal to the direction of elongation of the main stem 61. However, as shown in FIG. 11B for example, the shoulder 63 elongates away from the main stem 61 in a direction that is normal to the direction in which the cantilever 65 elongates away from the main stem 61.

As shown in FIG. 11B for example, the main stem 61 desirably is formed by a hollow, straight steel tube having a square transverse cross-sectional shape measuring about four inches on each side of the square. One of the opposite open ends of the main stem 61 is attached, as by welding for example, to one of the wider flat exterior surfaces of the base 62 so that the main stem 61 elongates in a direction that is perpendicular to the direction of elongation of the base 62. As shown in FIG. 11B for example, a pair of side support flanges 61*a* extend from the main stem 61 near where the main stem 61 is connected to the base 62 and where the main brace 65*b* is connected to the main stem 61. As shown in FIG. 4 for example, one end of a side brace 61*b* desirably is connected to a respective side support flange 61*a* and the opposite end of the side brace 61*b* desirably is connected to the respective barrier platform 40.

As shown in FIG. 11B for example, the base 62 desirably is formed by a straight hollow tube made of steel and having a square transverse cross-sectional shape measuring about four inches on each side of the square. Each of the opposite open ends of the base 62 desirably is covered by a mounting plate 62*a* that desirably is a flat, rectangular steel plate attached, as by welding for example, to the base 62.

As shown in FIG. 11B for example, a first bottom arm assembly 67 is attached, desirably by threaded bolts and nuts, to one of the mounting plates 62*a* on the base 62. A second bottom arm assembly 67 is similarly attached to the other one of the mounting plates 62*a* on the base 62. Each bottom arm assembly 67 desirably includes a rectangular, flat steel plate 67*a* attached on one flat side, as by welding for example, to the central flat portion of a C-shaped steel channel 67*b*, the legs 67*c* of which elongate in a direction normal to the flat steel plate 67*a* and face away from the flat steel plate 67*a*.

As shown in FIG. 11B for example, each bottom arm assembly 67 desirably includes a traveler in the form of a circular roller 67*e* fixed to one end of a cylindrical shaft 67*f* so that the shaft's axis of rotation passes through the center point of the roller 67*e*, which is rotatably held near one end of the bottom arm assembly 67. The roller 67*e* of the traveler is rotatable with respect to the flat steel plate 67*a* and the C-shaped steel channel 67*b* of the bottom arm assembly 67. As explained more fully below, the disposition of the traveler permits the outer circumferential cylindrical surface of the roller 67*e* to rotate on a respective guide track 50*b* of a respective carrier stanchion 50 as shown in FIG. 10A and FIG. 13 for example.

As shown in FIG. 11B for example, a respective keeper 67*j* is fixed, as by welding, to a respective one of the opposite ends of the bottom arm assembly 67 and spaced in opposition to the outer cylindrical surface of the roller 67*e*. Each keeper 67*j* desirably is formed as a flat rectangular steel disk that extends away from the flat steel plate 67*a* in a direction that is normal to the flat surface of the flat steel plate 67*a*. Thus, the keeper 67*j* of each bottom arm assembly 62 desirably extends away from the flat steel plate 67*a* in the direction that is opposite to the direction in which and the legs 67*c* of the C-shaped steel channel 67*b* extend away from the flat steel plate 67*a*. As shown in FIG. 10A and FIG. 13 for example, the disposition of the traveler leaves a gap 67*g* between the outer circumferential cylindrical surface of the roller 67*e* and the flat face of the keeper 67*j* facing the roller 67*e* of the traveler. This gap 67*g* defines a nip in which is received a respective guide track 50*b* of a respective carrier stanchion 50 and that allows the roller 67e of the traveler to rotate on that respective guide track 50b of a respective carrier stanchion 50. Additionally, the keepers 67j serve to restrain movement of the bottom arm assembly 67 in the direction away from the carrier stanchion 50 even in the event of damage to the respective guide rollers 67e that otherwise would be expected also to constrain such movement of the bottom arm assembly 67 away from the carrier stanchion 50.

As shown in FIG. 11B for example, each respective side wing 66 desirably is formed by a straight hollow tube made of steel and having a square transverse cross-sectional shape measuring about four inches on each side of the square. One of the opposite open ends of each respective side wing 66 is connected, as by welding, to a respective opposite side of the main stem 61. Each of the other opposite open ends of each respective side wing 66 desirably is covered by a mounting plate 66a, that is attached, as by welding for example, to each respective side wing 66. Each mounting plate 66a desirably is formed by a flat, rectangular steel plate.

As shown in FIG. 11B for example, a first top arm assembly 68 is attached, desirably by threaded bolts and nuts, to one of the respective mounting plates 66a on one of the respective side wings 66. A second top arm assembly 68 is similarly attached to the other one of the mounting plates 66a on the other one of the respective side wings 66. Each top arm assembly 68 desirably includes a rectangular, flat steel plate 68a that is attached on one flat side (as by welding for example) to the central flat portion of a C-shaped steel channel 68b, the two legs 68c of which elongate in a direction normal to the flat steel plate 68a and face away from the flat steel plate 68a.

As shown in FIG. 11B for example, each top arm assembly 68 desirably includes a traveler in the form like the traveler of the bottom arm assembly 67 and thus includes a circular roller 68e fixed to one end of a cylindrical shaft 68f so that the shaft's axis of rotation passes through the center point of the roller 68e, which is rotatably held near the end of the top arm assembly 68 that is disposed farthest from the free end of the cantilever 65. Each respective shaft 68f of each traveler desirably is rotatably connected to the top arm assembly 68 as by a threaded nut 68h. Thus, the traveler is rotatable with respect to the flat steel plate 68a and the C-shaped steel channel 68b of the top arm assembly 68. These circular guide rollers 68e desirably are formed of stainless steel. As explained more fully below, the disposition of the traveler permits the outer circumferential cylindrical surface 68g of the roller 68e to rotate on a respective guide track 50b of a respective carrier stanchion 50.

As shown in FIG. 11B for example, disposed below each roller 68e is a lower trip plate 68j, and above each roller 68e is an upper trip plate 68k. Each respective trip plate 68j, 68k is fixed, desirably as by welding, to the flat steel plate 68a of top arm assembly 68. The leading edge of each respective trip plate 68j, 68k is disposed just short of overhanging (or underhanging) the leading cylindrical surface 68g of the roller 68e so as not to interfere with the contact between the respective guide track 50b of a respective carrier stanchion 50 and the leading cylindrical surface 68g of the roller 68e.

The shoulder 63 desirably is formed by a hollow, straight steel tube having a square transverse cross-sectional shape measuring about four inches on each side of the square. As shown in FIG. 11B for example, the mid-section of the shoulder 63 is attached, as by welding for example, to the upper end of the main stem 61. Extending a relatively short distance from each opposite end of the shoulder 63 is a respective mounting strut 63a, which desirably is formed by a hollow, straight steel tube having a rectangular transverse cross-sectional shape measuring about four inches on each longer side of the rectangle and about two inches on each shorter side. One opposite end of each mounting strut 63a is connected, as by welding for example, to the shoulder 63. Each mounting strut 63a desirably elongates in a straight line away from the shoulder 63 in a direction that is opposite to the direction in which the cantilever 65 elongates away from the main stem 61.

As shown in FIG. 11B for example, the opposite end of each respective mounting strut 63a is connected, as by welding for example, to a mounting bracket 63b, which desirably is formed by a flat, square steel disk. Each respective mounting bracket 63b desirably is connected to the mounting strut 63a so that the respective free edge of the respective mounting bracket 63b extends in the direction of elongation of the shoulder 63 beyond the respective near end of the shoulder 63, in effect widening the span of the shoulder 63.

As shown in FIG. 11B for example, each main drive carriage 60 desirably includes a bumper support assembly 71 that desirably includes a mounting bar 71a, which desirably is formed by a straight length of steel C-channel, the projecting flanges 71b of which extend in a direction that is normal to the central flat portion of the C-channel and face in a direction that is toward the shoulder 63. Each respective opposite end of the bumper support assembly 71 is connected (as by threaded bolt 71c and nut 71d for example) to a respective one of the mounting brackets 63b of a respective mounting strut 63a. Desirably, the bumper support assembly 71 is an adjustable bumper support assembly 71. One mode of adjustment is effected by its ability to change the positioning of the bumper support assembly 71 relative to the main drive carriage 60. Accordingly, an embodiment of an adjustable bumper support assembly 71 is rendered adjustable by the addition or omission of one or several spacer plates 71e that can be interposed between each respective mounting bracket 63b and the respective opposite end of a bumper support assembly 71 attached to the respective mounting bracket 63b.

As shown in FIG. 11B for example, on the side of the bumper support assembly 71 opposite from the side where the projecting flanges 71b extend, there desirably are a plurality of high load plastic compression springs 72. Each compression spring 72 desirably is made of a polyester-based elastomer that is about ten times more durable than most rubber and about twenty times more durable than polyurethane. Though only two compression springs 72 are partially visible in the view of FIG. 11B, directly beneath each of those two partially visible compression springs 72 is another compression spring 72, making a total of four such compression springs 72 mounted to each mounting bar 71a of each bumper support assembly 71.

Each compression spring 72 is resilient and desirably is rated at an energy absorbing capacity of 3,000 inch-pounds and a peak dynamic force of 6,000 pounds, which is the load on the compression spring 72 when fully compressed at its rated energy. Another mode of adjustment that can be provided to an adjustable bumper support assembly 71 resides with the selection of the energy absorbing capacity of the compression springs 72 as well as the number of the compression springs 72 that are included in the adjustable bumper support assembly 71. Each compression spring 72 desirably is hollow and barrel-shaped with a maximum outside diameter of 2.54 inches and a height of 2.26 inches in an uncompressed state. When fully compressed, each compression spring 72 desirably assumes a height of 1.25 inches and an outside diameter of 3.22 inches. Except for a central hole for attaching each compression spring 72 (desirably by a threaded nut and bolt) to the respective central flat portion of the C-channel mounting bar 71a of the respective bumper support assembly 71, each compression spring 72 desirably has a closed base of 2.23 inches in diameter. Each end of each compression spring 72 opposite to the respective base of the compression spring 72 desirably is open with an inside diameter of 1.28 inches.

As shown in FIG. 11B for example, the neck fixture 64 of the main drive carriage 60 is connected, as by welding, to the opposite side of the shoulder 63 than the side of the shoulder 63 that is connected to the main stem 61. The neck fixture 64 desirably is centered with respect to the opposite ends of the shoulder 63 and desirably is disposed in vertical alignment with the main stem 61. For added structural integrity, a respective side brace 64a, which desirably is formed by a steel triangular plate, desirably is connected between each respective side of the neck fixture 64 and the upper surface of the shoulder 63 such that each side brace 64a has one of its respective shorter sides connected, as by welding for example, to the neck fixture 64 and the other one of its respective shorter sides connected, as by welding for example, to the shoulder 63.

As shown in FIG. 11B for example, the main drive carriage 60 desirably includes an anchor plate 64c at the top of the neck fixture 64. A centrally located hole 64b is provided through the anchor plate 64c of the neck fixture 64. It is through this hole 64b that a bolt 53a attaches to the anchor plate 64c of the neck fixture 64, the respective end of the chain 53 that engages the drive sprocket 52b and the idler sprocket 52c. One end of the bolt 53a is connected to the chain 53, and an opposite end of the bolt 53a desirably is externally threaded to receive an internally threaded nut 53b. In this way, as shown in FIG. 13 and FIG. 10A for example, each main drive carriage 60 is connected to a barrier platform 40 so as to carry and support one half of that barrier platform 40. To facilitate repairs, this bolt 53a desirably is selectively connected and disconnected, at the option of the user, to the anchor plate 64c of the main drive carriage 60.

As shown in FIG. 11B for example, the lower guide slot 67g of each of the bottom arm assemblies 67 desirably is defined between the respective guide roller 67e and the respective keeper 67c disposed at the free end of the bottom arm assembly 67. A respective one of the guide tracks 50b is received in a respective lower guide slot 67g of a respective bottom arm assembly 68 and so constrains to a narrow vertical column, the vertical movements of the main drive carriage 60. In so doing, the walkway 43 of the barrier platform 40 connected to the main drive carriage 60 is maintained in a level horizontal plane during ascent and descent of the barrier platform 40.

As shown in FIG. 11B for example, the construction of each top arm assembly 68 of the main drive carriage 60 differs somewhat from the construction of each bottom arm assembly 67. In each top arm assembly 68, the guide roller 68e is disposed at the free end of the top arm assembly 68, and there is no keeper disposed in opposition to the guide roller 68e. Thus, as shown in FIG. 10A for example, an upper guide slot 68m in which the guide track 50b is received is not defined solely by the components of the top arm assembly 68. Instead, the guide track 50b is received in the gap 68m that exists between the guide roller 68e and the side wing 66 that carries the top arm assembly 68.

As shown in FIG. 10A for example, the respective guide rollers 67e, 68e of each respective bottom arm assembly 67 and respective top arm assembly 68 each of each main drive carriage 60 on one side of the loading bay 24d allow the two main drive carriages 60 (and the barrier platform 40 attached to the two main drive carriages 60) to track up and down on the guide tracks 50b of the respective one pair of the carrier stanchions 50 installed at that one side of the loading bay 24d. However, the guide roller 67e of each bottom arm assembly 67 desirably rides on the opposite surface of the respective guide track 50b than the surface on which the respective guide roller 68e of the top arm assembly 68 rides. By having the guide rollers 67e of the bottom arm assemblies 67 ride on one surface of each guide track 50b and the guide rollers 68e of the top arm assemblies 68 ride on the opposite surface of each guide track 50b, a tighter constraint on the vertical alignment of the main drive carriage 60 with the exterior surface of the hollow support tube 50a of the carrier stanchion 50 is maintained as each main drive carriage 60 slidably engages the respective carrier stanchion 50. In this way, vertical movements of the main drive carriages 60 are kept parallel to the exterior surfaces of the hollow support tubes 50a of the carrier stanchions 50 as the respective guide rollers 67e, 68e ride on the respective guide tracks 50b, and thus the main drive carriages 60 slidably engage the carrier stanchions 50.

Moreover, as shown in FIG. 11B for example, the bumper support assembly 71 is disposed in closer proximity to the top arm assembly 68 than to the bottom arm assembly and is disposed above the top arm assembly 68 and above the upper end of the main stem 61 and above the cantilever 65. Because of this disposition of the bumper support assembly 71, the bumper support assembly 71 will constrain movement of the top arm assembly 68 toward the carrier stanchion 50 so that the guide track 50b cannot touch the side wing 66 that carries the top arm assembly 68. As shown in FIG. 13 for example, the compression springs 72 of the bumper support assembly 71 will make contact with the carrier stanchion 50 and become fully compressed before the top arm assembly 68 moves close enough to the carrier stanchion 50 to permit the side wing 66 to scrape against the carrier stanchion 50. As to movement of the top arm assembly 68 in the direction away from the carrier stanchion 50, the forward edges of the respective trip plates 68j, 68k of each top arm assembly 68 will constrain such movement of the top arm assembly 68 even in the event of damage to the respective guide rollers 68e, which otherwise would constrain such movement of the top arm assembly 68 away from the carrier stanchion 50.

As shown in FIG. 14 for example, the opposite and of the chain 53 desirably is fixed to a counterweight 54 that is disposed within the hollow support tube 50a of the carrier stanchion 50 and is configured to move up and down within the hollow support tube 50a of the carrier stanchion 50. The counterweight 54 desirably includes a hollow outer casing 54a and a plurality of weights 54b disposed within the hollow interior of the outer casing 54a. The counterweight 54 desirably includes several steel plates welded together into a rectangular steel block to gain the desired weight, which in many cases will be on the order of about 500 pounds. Each of the steel plates 54b in the counterweight 54 desirably is about an inch thick.

As shown in the enlarged detail in FIG. 14 for example, this opposite end of the chain 53 is connected to one end of a bolt 53c, and an opposite end of the bolt 53c desirably is externally threaded to receive an internally threaded nut 53d. The threaded end of the bolt 53c is screwed through the threaded nut 53d and then extended through a hole at the top of the outer casing 54a and secured by a couple of nuts 54c attached to the bolt 53c from the interior of the outer casing 54*a*. Through manipulation of the respective nuts 53*c*, 54*c*, it is possible to adjust the position of the counterweight 54 relative to the chain 53 as well as remove the counterweight from the chain 53 in order to change weights 54*b* if needed.

As shown in FIG. 14 for example, to allow maintenance and/or assembly servicing of the connection of the chain 53 to the counterweight 54, each carrier stanchion 50 is provided with a chain access opening 56 that is defined through the inner casing 50*a* near the bottom of each carrier stanchion 50. A cover plate 56*a* also is provided to close the chain access opening 56 when not in use.

Additionally, as shown in FIG. 14 for example, a support rod 56*c* is provided so that the counterweight 54 can be held at the height needed for servicing through the chain access opening 56. The support rod 56*c* extends through two coincident openings 56*d* defined through the inner casing 50*a* beneath the chain access opening 56. Each end of the support rod 56*c* is provided with a stop ring 56*e* that desirably is attached by a set screw extending radially through the stop ring 56*e*. Each stop ring 56*e* serves to prevent withdrawal of the support rod 56*c* from the openings 56*d*.

Moreover, as shown in FIG. 14 for example, the transverse shape of the exterior surface of the counterweight 54 desirably is the same polygon as the transverse shape of the interior surface of the hollow support tube 50*a* of the carrier stanchion 50. In this way, rotation of the counterweight 54 within the hollow support tube 50*a* around the vertical axis of the chain 53 is avoided along with any torque of the chain 53 that would accompany such relative rotation between the counterweight 54 and the hollow support tube 50*a*.

As shown in FIG. 2, FIG. 3B, FIG. 4 and FIG. 4A for example, a first front main drive carriage 60 is carried by a first front carrier stanchion 50, which is disposed relatively farther from the loading dock 24, and connected to the first barrier platform 40. As shown in FIG. 2 and FIG. 4 for example, a first rear main drive carriage 60 is carried by a first rear carrier stanchion 50, which is disposed relatively closer to the loading dock 24, and connected to the first barrier platform 40. Because the front main drive carriage 60 is identical to the rear main drive carriage 60, the designations "front" and "rear" are arbitrary and could be reversed. As shown in FIG. 2 and FIG. 4 for example, the first front main drive carriage 60 is disposed farther from the loading dock 24 and spaced apart from the first rear main drive carriage 60 by a distance comparable to the distance separating the front and rear carrier stanchions 50 in the first pair of carrier stanchions 50. As shown in FIG. 2 and FIG. 4 for example, the first front main drive carriage 60 slidably engages one of the carrier stanchions 50 of the first pair of carrier stanchions 50, and the first rear main drive carriage 60 slidably engages the other one of the carrier stanchions 50 of the first pair of carrier stanchions 50.

As shown in FIG. 2 and FIG. 4 for example, a second front main drive carriage 60 is carried by a second front carrier stanchion 50, which is disposed relatively farther from the loading dock 24, and is connected to the second barrier platform 40, and a second rear main drive carriage 60 is carried by a second rear carrier stanchion 50, which is disposed relatively closer to the loading dock 24, and connected to the second barrier platform 40 and spaced apart from the second front main drive carriage 60 by a distance comparable to the distance separating the two carrier stanchions 50 in the second pair of carrier stanchions 50. The second front main drive carriage 60 slidably engages one of the carrier stanchions 50 of the second pair of carrier stanchions 50, and the second rear main drive carriage 60 slidably engages the other one of the carrier stanchions 50 of the second pair of carrier stanchions 50.

As shown in FIG. 2 and FIG. 10 for example, each of the carrier stanchions 50 of the pair of vertically extending carrier stanchions 50 situated on one side of the loading bay 24*d* is connected via a chain 53 to a main drive carriage 60 that is connected to one of the barrier platforms 40. Two other carrier stanchions 50 are similarly situated on the opposite side of the loading bay 24*d* and similarly connected via other chains 53 to the other barrier platform 40 on the other side of the loading bay 24*d*. As shown in FIG. 13 and FIG. 15 for example, each chain 53 is engaged by the two sprockets 52*b*, 52*c* that are rotatably supported atop a respective one of the carrier stanchions 50.

As shown in FIG. 2, FIG. 3 and FIG. 4 for example, a first motor 32 is carried by the first pair of carrier stanchions 50. The first motor 32 is mechanically connected to the first barrier platform 40 in such a manner so that operation of the first motor 32 selectively moves the first barrier platform 40 vertically along the first pair of carrier stanchions 50. When operation of the motor 32 rotates the motor's output shaft in a first direction, the first barrier platform 40 is raised vertically along the first pair of carrier stanchions 50. Indeed, as shown in FIGS. 9 and 10 for example, the motor and the heights of the pair of carrier stanchions that carry the motor are configured so that the associated barrier platform can be raised high enough so that any trailer 23 and its load can be received in the loading bay without coming into contact with the associated barrier platform. When operation of the motor 32 rotates the motor's output shaft in a second direction, which is opposite to the first direction, then the first barrier platform 40 is lowered vertically along the first pair of carrier stanchions 50. FIG. 10 shows a view of the barrier platforms 40 in their raised (storage) position, and FIG. 2 shows a view of the barrier platform 40 in their lowered (working) position.

As shown in FIG. 2, FIG. 3 and FIG. 4 for example, a second motor is carried by the second pair of carrier stanchions 50 disposed on the second side of the loading bay 24*d*. The second motor is mechanically connected to the second barrier platform 40 in such a manner so that operation of the second motor 32 selectively moves the second barrier platform 40 vertically along the second pair of carrier stanchions 50. When operation of the second motor 32 rotates the motor's output shaft in a first direction, the second barrier platform 40 is raised vertically along the second pair of carrier stanchions 50. When operation of the motor 32 rotates the motor's output shaft in a second direction, which is opposite to the first direction, then the second barrier platform is lowered vertically along the second pair of carrier stanchions 50.

As shown in FIG. 2, FIG. 3, FIG. 4, FIG. 13 and FIG. 15 for example, each respective motor 32 desirably is attached midway along the side extrusion 55*b* that connects two carrier stanchions 50 on one respective side of the loading bay 24*d*. A first end of a first drive shaft 33*a* is connected, either directly to the motor 32 or via a gear box connected to the motor 32, so as to be rotated by operation of the motor 32. As shown in FIG. 2, FIG. 3 and FIG. 4 for example, the first drive shaft 33*a* extends from a first side of the motor 32 and elongates essentially parallel to the side extrusion 55*b*. As shown in FIG. 15 for example, the opposite second end of the first drive shaft 33*a* is rigidly connected via a linkage 34*a* to the drive sprocket rod 52*d* extending out of the sprocket housing 52 on top of a first carrier stanchion 50 disposed on one side of the loading bay 24*d*. As shown in FIG. 14 for example, this respective drive sprocket rod 52*d* in turn is rigidly attached to the respective drive sprocket 52*b* of the sprocket housing 52, which as shown in FIG. 13 for example is attached on top of a first carrier stanchion 50 disposed on this one side of the loading bay 24*d*. The use of a linkage 34*a* instead of a direct connection facilitates assembly, disassembly and repair at the appropriate occasions.

Similarly, as shown in FIG. 2 and FIG. 4 for example, a first end of a second drive shaft 33*b* is connected, either directly to the motor 32 or via a gear box connected to the motor 32, so as to be rotated by operation of the motor 32. The second drive shaft 33*b* extends from a second side of the motor 32 and essentially parallel to the side extrusion 55*b* on the opposite side of the motor 32. The opposite end of the second drive shaft 33*b* is rigidly connected via a linkage 34*b* to the drive sprocket rod 52*d* that in turn is rigidly attached to the drive sprocket 52*b* of the sprocket housing 52 on top of a second carrier stanchion 50 disposed on the one side of the loading bay 24*d*. Each drive shaft 33*a*, 33*b* desirably is formed by a straight steel rod that desirably has a circular transverse cross-sectional shape.

Moreover, as shown in FIG. 15 for example, the first drive shaft 33*a* has one of its ends closer to the sprocket housing 52 on top of a respective carrier stanchion 50, and desirably it is this end of the drive shaft 33*a* that is supported by a bearing 33*c* that is connected to and disposed above the upper surface of the side extrusion 55*b*. Similarly, as shown schematically in FIG. 2 for example, the end of the second drive shaft 33*b* closer to the sprocket housing 52 carried by the other carrier stanchion 50 on the same side of the loading bay 24*d* desirably is supported by a bearing 33*d* that is connected to and disposed above the upper surface of the side extrusion 55*b*. As shown schematically in FIG. 2 for example, intermediate bearing supports 33*e* can be spaced apart along the side extrusion 55*b* to support the drive shafts 33*a*, 33*b*. Moreover, the motor 32 is provided with appropriate gearing so that each respective driveshaft 33*a*, 33*b* rotates in a direction so that the chain 53 is taken up or played out in the same manner within each respective carrier stanchion supporting a respective barrier platform 40. Thus, the motor 32 can be operated to rotate the two drive sprockets 52*b* on the two carrier stanchions 50 on one side of the loading bay 24*d* simultaneously via the two horizontally extending first and second drive shafts 33*a*, 33*b*.

As shown in FIG. 13 for example, one end of the chain 53 is anchored to the bolt 53*a* that is attached to the anchor plate 64*c* of the neck fixture 64 of the main drive carriage 60. From there, as shown in FIG. 13 and FIG. 15 for example, the chain 53 loops around the idler sprocket 52*c* and the drive sprocket 52*b* that are rotatably carried between the respective sprocket bearings 52*i*, 52*h* in the sprocket housing 52 at the upper end of the carrier stanchion 50. The chain 53 then descends into the hollow inner casing 50*a* of the carrier stanchion 50 until as shown in FIG. 14 for example, the opposite end of the chain 53 desirably is connected to the counterweight 54. As schematically shown in FIG. 13 for example, as the main drive carriage 60 descends, the counterweight 54 will ascend. Similarly, as the main drive carriage 60 ascends, the counterweight 54 will descend.

The motor 32 drives both of the drive sprockets 52*b* at the top of the carrier stanchions 50 that are disposed on the same side of the loading bay 24*d*. When the motor 32 is operated to rotate its output shaft in a first direction, then each respective chain 53 that engages the pair of sprockets 52*b*, 52*c* is reeled into the hollow interiors of the two carrier stanchions 50 on the same side of the loading bay 24*d* to raise the respective barrier platform 40 on that same side of the loading bay 24*d*. Alternatively, when the motor 32 is operated to rotate its output shaft in a second direction that is opposite to the first rotational direction, then each respective chain 53 that engages the pair of sprockets 52*b*, 52*c* is played out from within the hollow interiors of the two carrier stanchions 50 on the same side of the loading bay 24*d* to lower the barrier platform 40 on that same side of the loading bay 24*d*.

The motors 32 on both sides of the loading bay 24*d* desirably are controlled so that both barrier platforms 40 move simultaneously, whether ascending the carrier stanchions 50 or descending the carrier stanchions 50. However, the motors 32 on both sides of the loading bay 24*d* also can be controlled so that both barrier platforms 40 move independently, whether ascending the carrier stanchions 50 or descending the carrier stanchions 50. Moreover, as shown in FIG. 2 for example, at least one of the carrier stanchions 50 on each side of the loading bay 24*d* desirably carries a lower limit switch 57*a* and an upper limit switch 57*b*, the motor 32 being turned off upon activation of either of the limit switches 57*a*, 57*b*.

As shown in FIG. 3A and FIG. 10A for example, a mounting bracket 57*c* desirably is attached near the lower end of the carrier stanchion 50. As shown in FIG. 10A, a lower limit switch 57*a* can be connected to the mounting bracket 57*c*. As shown in FIG. 10A for example, the lower limit switch 57*a* desirably is mounted to the carrier stanchion 50 and disposed so that it will be tripped by contact with the lower trip plate 68*j* of the top arm assembly 68 of main drive carriage 60 when the barrier platform 40 has descended to the height where the forklift rub rail 44 is disposed just above the upper surface of the flatbed trailer 23 and thus has attained the working position, which is shown in FIG. 2 for example.

As shown in FIG. 10A for example, a shield 50*e* desirably is attached to each side of the bottom portion of each carrier stanchion 50 and configured and disposed to shield the lower limit switch 57*a* and the main drive carriage 60 when the latter is disposed in the operative position with the barrier platform 40 fully descended to provide fall protection for the forklift trucks 21 being driven on the flatbed trailer 23. A lower mounting strip 50*f* is attached, as by welding, just above the foot 51 of the carrier stanchion 50 and to the side of the carrier stanchion 50 opposite the side facing the barrier platform 40. An upper mounting strip 50*g* is attached, as by welding, to the same side of the carrier stanchion 50 that is opposite the side facing the barrier platform 40 and spaced vertically above the lower mounting strip 50*f*. One end of each shield 50*e* is attached, as by threaded bolts and nuts for example, to one end of the lower mounting strip 50*f*, and the other end of each shield 50*e* is similarly connected to one end of the upper mounting strip 50*g*.

Similarly, as shown in FIG. 13 for example, a mounting bracket 57*c* desirably is attached near the upper end of the carrier stanchion 50. As shown in FIG. 11A for example, an upper limit switch 57*b* desirably is mounted to the carrier stanchion 50 by being attached to this mounting bracket 57*c*. The upper limit switch 57*b* desirably can be connected to this mounting bracket 57*c* and disposed so that it will be tripped by contact with the upper trip plate 68*k* of the top arm assembly 68 of main drive carriage 60 when the barrier platform 40 has ascended to the height where the barrier platform 40 attains the storage position, which is shown in FIG. 10 for example.

As shown in FIG. 2 and FIG. 4 for example, a cab driver control panel 35 desirably is disposed on one side of a loading bay 24*d* at an entrance to the loading bay 24*d* near where the cab 23a of a flatbed trailer 23 would be parked, at least during the beginning of either a loading session or an unloading session of the flatbed trailer 23. The dashed lines designated 35b schematically represent that the cab control panel 35 is electrically connected (or wirelessly connected) to control the two motors 32 on opposite sides of the loading bay 24d to raise and lower the barrier platforms 40 on both sides of the loading bay 24d.

As shown in FIG. 2 and FIG. 4 for example, a forklift operator control panel 36 desirably is disposed on the loading dock 24 near where the forklift truck 21 would approach the loading bay 24d where a flatbed trailer 23 would be parked, at least during the beginning of either a loading session or an unloading session of the flatbed trailer 23. The dashed lines designated 36b schematically represent that the forklift control panel 36 is electrically connected (or wirelessly connected) to control the two motors 32 on opposite sides of the loading bay 24d to raise and lower the barrier platforms 40 on both sides of the loading bay 24d.

Each of these respective control panels 35, 36 desirably is mounted on its own respective stand 35a, 36a that extends vertically above the ground and respectively situated so that either the truck driver can manipulate the cab driver control panel 35 from the truck cab 23a or the operator of the forklift truck 21 can manipulate the forklift operator control panel 36 from the loading dock 24 while sitting in the forklift truck 21.

The control panels 35, 36 are connected to the lower limit switch 57a so that tripping the lower limit switch 57a turns off the motor 32 when the barrier platform 40 has descended to the height where the forklift rub rail 44 is disposed just above the upper surface of the flatbed trailer 23 as shown in FIG. 2, FIG. 4 and FIG. 7 for example. Additionally, the control panels 35, 36 are connected to the lower limit switch 57a so that when the lower limit switch 57a is tripped, the side gate 47c of the stair unit 47 desirably is unlocked to allow access to and from the platform 47b of the stair unit 47. As shown in FIG. 2 for example, desirably only the two carrier stanchions 50 disposed closer to the truck cab 23a need be provided with lower limit switches 57a.

The control panels 35, 36 are connected to the upper limit switch 57a so that tripping the upper limit switch 57b turns off the motor 32 when the barrier platform 40 has ascended to the height where the barrier platform 40 attains the storage position such as shown in FIG. 9 and FIG. 10 for example. Additionally, the control panels 35, 36 are connected to the upper limit switch 57b so that when the upper limit switch 57b is tripped, the side gate 47c of the stair unit 47 desirably is locked to prevent access from the platform 47b of the stair unit 47. As shown in FIG. 2 for example, desirably only the two carrier stanchions 50 disposed closer to the truck cab 23a need be provided with upper limit switches 57b.

As shown in FIG. 3, FIG. 3A, FIG. 3B, FIG. 6, FIG. 7, FIG. 8A, FIG. 8B, FIG. 9, FIG. 10, FIG. 10A and FIG. 10B for example, each barrier platform 40 carries its own forklift rub rail 44. As shown in FIG. 3A, FIG. 11A and FIG. 13 for example, each respective main drive carriage 60 is configured to cooperate with its respective slidably engaged carrier stanchion 50 so as to resiliently absorb impacts from collisions between a forklift truck 21 (FIG. 1 & FIG. 2) and the respective forklift rub rail 44 of the respective barrier platform 40 that is connected to the respective main drive carriage 60. Similarly, as shown in FIG. 3A, FIG. 3B and FIG. 4A for example and explained more fully below, each barrier platform 40 carries a plurality of alignment collars 80, and each alignment collar 80 is configured to cooperate with its respective bumper support post 70 so as to absorb impacts from collisions between a forklift truck 21 (FIG. 1 & FIG. 2) and the respective forklift rub rail 44 of the respective barrier platform 40 connected to the respective alignment collar 80.

Each of the main drive carriages 60 cooperates with and is slidably engaged with its respective carrier stanchion 50 in the same manner. Each respective main drive carriage 60 is configured to cooperate with the respective slidably engaged carrier stanchion 50 so as to resiliently absorb impacts from collisions between a forklift truck 21 and the respective forklift rub rail 44 of the respective barrier platform 40 connected to the respective main drive carriage 60. These relationships will be illustrated by reference to the first front main drive carriage 60 that is connected to the first barrier platform 40 as shown in FIG. 2, FIG. 3B, FIG. 4 and FIG. 4A for example.

As noted above, each main drive carriage 60 desirably also carries a sufficient number of high-strength compression springs 72 mounted so as to allow each main drive carriage 60 to absorb about two inches of compression were a forklift truck 21 to run into the forklift rub rail 44 that is fixed to the free outer side 41c (FIG. 10B) of the inner rail 41a of the barrier platform 40 to slow the forklift truck 21 to a stop before the wheels 21a of forklift truck rolled past a side edge 23b of the flatbed trailer 23. As shown in FIG. 10A, FIG. 10B and FIG. 4A for example, at least one main drive carriage 60 includes a plurality of compression springs 72. Desirably, each of the main drive carriages 60 will include a plurality of compression springs 72. Desirably, each of the main drive carriages 60 will include at least a pair of compression springs 72. Desirably, each of the main drive carriages 60 will include at least a four compression springs 72. Each compression spring 72 desirably is disposed to face the outer surface of the hollow inner casing 50a of the respective slidably engaged carrier stanchion 50 so as to absorb impacts from collisions between a forklift truck 21 and the respective forklift rub rail 44 of the respective barrier platform 40 connected to the respective main drive carriage 60.

Desirably, as shown in FIG. 2 for example, a plurality of bumper support posts 70 is provided. FIG. 4 shows one of the barrier platforms 40 from the side as well as the two taller carrier stanchions 50 that carry the barrier platform 40. As shown in FIG. 4 there are three bumper support posts 70 that desirably extend about five feet vertically above the ground and thus are much shorter than the carrier stanchions 50. As shown in FIG. 2, FIG. 3 and FIG. 4 for example, a first plurality of bumper support posts 70 is disposed along the first side of the loading bay 24d. Three such bumper support posts 70 and two carrier stanchions 50 desirably are spaced equally apart along the length of each of the longer sides of each trailer loading bay 24d. Similarly, a second plurality of bumper support posts 70 is disposed along the second side of the loading bay 24d. Each bumper support post 70 of the second plurality of bumper support posts 70 desirably is spaced apart from each other bumper support post 70 of the second plurality of bumper support posts 70 and from each carrier stanchion 50 of the second pair of carrier stanchions 50. The three bumper support posts 70 on each opposite side of the loading bay 24d give the barrier platforms 40 added support and strength to absorb the impact of a forklift truck 21 running into the forklift rub rail 44 on the inner rail 41a of the barrier platform 40.

For each bumper support post 70 there desirably is provided an alignment collar 80 that is connected to the respective one of the barrier platforms 40. Thus, there is a one-to-one correspondence between each respective alignment collar 80 and one of the bumper support posts 70. As shown in FIG. 3 and FIG. 4 for example, a first plurality of alignment collars 80 is connected to the first barrier platform 40. Each of the first plurality of alignment collars 80 is spaced apart from each other one of the first plurality of alignment collars 80 along the length of the first barrier platform 40 so that each respective one of the first plurality of alignment collars 80 is disposed to align vertically with a respective one of the first plurality of bumper support posts 70 disposed along the first side of the loading bay 24d. Similarly, a second plurality of alignment collars 80 is connected to the second barrier platform 40. Each respective one of the second plurality of alignment collars 80 is spaced apart from each other one of the second plurality of alignment collars 80 along the length of the second barrier platform 40 so that each respective one of the second plurality of alignment collars 80 is disposed to align vertically with a respective one of the second plurality of bumper support posts 70 disposed along the second side of the loading bay 24d.

As shown in FIG. 3 and FIG. 4 for example, each barrier platform 40 desirably is connected to and carries three spaced apart alignment collars 80. As shown in FIG. 3 and FIG. 3A for example, each respective alignment collar 80 is configured to cooperate with a respective bumper support post 70 so as to absorb impacts from collisions between the forklift truck 21 and the respective forklift rub rail 44 of the respective barrier platform 40 connected to the respective alignment collar 80. As shown in FIG. 3A for example, each respective alignment collar 80 includes components that surround three sides of the respective support post 70 and thus is configured to receive therethrough a respective one of the bumper support posts 70. Once the barrier platform 40 nears the lowered position shown in FIG. 2 and FIG. 4 for example, each of the three alignment collars 80 aligns itself to receive through the alignment collar 80, the upper end of a respective one of these three bumper support posts 70.

FIG. 3A schematically depicts an alignment collar 80 in its assembled form, and FIG. 3B schematically depicts an alignment collar 80 in its partially dis-assembled form. As shown in FIG. 3, FIG. 3A and FIG. 3B for example, at least one alignment collar 80 includes a plurality of compression springs 72. Desirably, each of the alignment collars 80 will include a plurality of compression springs 72. Desirably, each of the alignment collars 80 will include at least a pair of compression springs 72 that desirably is disposed to face the respective bumper support post 70 so as to absorb impacts from collisions between a forklift truck 21 and the respective forklift rub rail 44 of the respective barrier platform 40 connected to the respective alignment collar 80. Each alignment collar 80 desirably is configured so as to allow each alignment collar 80 to absorb about two (2) inches of compression to slow the forklift truck 21 to a stop if the forklift truck 21 were to run into the forklift rub rail 44 that is carried on the barrier platform 40. An enlarged, partial assembly view of an alignment collar 80 is shown in FIG. 3B in relation to one end of a barrier platform 40.

As shown in FIG. 3B for example, the alignment collar 80 desirably includes a mounting pedestal 81 that elongates in a direction that is normal to the elongation direction of the outer rail 41b. The mounting pedestal 81 desirably is formed by a short length of hollow steel extrusion having a square, transverse cross-sectional shape measuring about four inches on each side of the square. One end of the pedestal 81 is attached, desirably as by welding for example, to the outer rail 41b of the barrier platform 40. The opposite end of the pedestal 81 is connected, desirably as by welding for example, to a middle bracket 82, which is disposed between a pair of side brackets 83, with one end of the middle bracket 82 connected to one of the side brackets 83 and the opposite end of the middle bracket 82 connected to the other side bracket 83. Each of the middle bracket 82 and the two side brackets 83 desirably is formed by a straight length of steel C-channel, the respective projecting flanges 82a, 83a of which extend in a direction that is normal to the respective central flat portion 82b, 83b of the C-channel.

As shown in FIG. 3B for example, the projecting flanges 82a of the middle bracket 82 face in a direction that is toward the pedestal 81. The middle bracket 82 of each alignment collar 80 desirably has four (4) high-strength compression springs 72 mounted on the side of the central flat portion 82b of the C-channel that faces away from the direction in which the projecting flanges 82a extend. As shown in FIG. 10B for example, each compression spring 72 desirably is attached to the central flat portion 82b of the C-channel by a threaded bolt 82c extending through a hole formed in the center of the spring 72. As schematically indicated by the dashed line in FIG. 3B, the spring 72 is secured by a washer 82d disposed between the spring 72 and one side of the central flat portion 82b of the C-channel and a threaded nut 82e screwed onto the threaded end of the bolt 82c on the opposite side of the central flat portion 82b of the C-channel.

As shown in FIG. 3B for example, one compression spring 72 desirably is so mounted at each corner of a rectangular array with the spacing between the upper row of two springs 72 and the lower row of two springs 72 being smaller than the spacing between the first column of two springs 72 and the second column of two springs 72. In this way, when the barrier platform 40 is disposed in the lowered position and the respective alignment collar 80 receives its respective bumper support post 70, the compression springs 72 mounted to the respective middle bracket 82 of the alignment collar 80 will be disposed in opposition to a respective side of the respective bumper support post 70. Thus, if the forklift truck 21 hits the forklift rub rail 44 directly head-on, then the compression springs 72 of the respective middle bracket 82 will be disposed to absorb the component of such head-on impacts that moves the alignment collar 80 toward the respective opposing side of the bumper support post 70.

As shown in FIG. 3B for example, attached, desirably as by welding for example, to each opposite end of the middle bracket 82 is a mounting plate 82f that has bores for receiving threaded bolts for connecting one of the side brackets 83 to a respective mounting plate 82f. Desirably, the positioning of the respective side bracket 83 is adjustable by the addition or omission of one or several spacer plates 82g that can be interposed between each respective mounting plate 82f and the respective end of the respective side bracket 83 that is attached to the respective mounting plate 82f. In this way, differently dimensioned bumper support posts 70 can be accommodated, and any misalignments between the alignment collar 80 and the respective bumper support post 70 detected during erection of the forklift fall protection unit 30 also can be accommodated. A respective end of the middle bracket 82 is connected, as by a plurality of threaded bolts 83c, to one end of each side bracket 83 so that the projecting flanges 83a of the side bracket 83 extend in a direction away from the middle bracket 82. As the dashed line schematically shows in FIG. 3B for example, desirably the shaft of each bolt 83c will extend through coincident holes formed through the central flat portion 83b of the side bracket 83 and through the spacer plates 82g and be secured by at least one washer 83d and a threaded nut 83e for example.

Each side bracket 83 desirably has at least one high-strength compression spring 72 mounted, as by a threaded bolt extending through a central hole and secured by washers and a threaded nut for example, on the side of the central flat portion 83b of the C-channel that faces away from the direction in which the projecting flanges 83a of the side bracket 83 extend. This compression spring 72 desirably is disposed at the end of the side bracket 83 that is opposite the end that is connected to the middle bracket 82. Thus, at least a first one of the plurality of compression springs 72 is disposed to face in a direction that is normal to the direction that is faced by at least a second one of the plurality of compression springs 72. In this way, when the barrier platform 40 is disposed in the lowered position and the respective alignment collar 80 receives its respective bumper support post 70, the compression spring 72 of each side bracket 83 will be disposed in opposition to a respective side of the respective bumper support post 70. Thus, if the forklift truck 21 hits the forklift rub rail 44 at an angle rather than head-on, then the compression spring 72 of at least one of the side brackets 83 will be disposed to absorb the component of such angled impacts that moves the alignment collar 80 toward the respective side of the bumper support post 70. Accordingly, this configuration of the alignment collar 80 with at least a first one of the plurality of compression springs 72 disposed to face in a direction that is normal to the direction that is faced by at least a second one of the plurality of compression springs 72, affords the forklift fall protection unit 30 the ability to absorb angled impacts from the forklift truck 21 against the forklift rub rail 44.

Figure 16A:
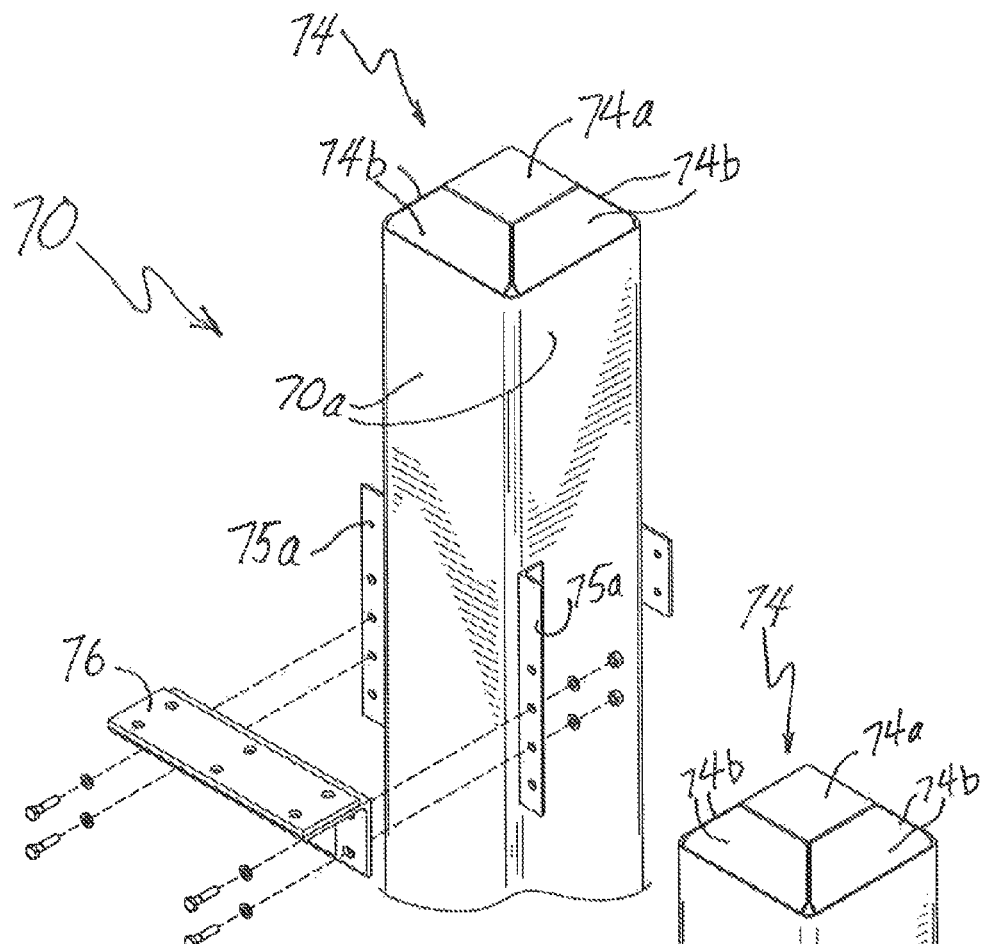
FIG. 16A is an elevated perspective view of embodiments of disassembled selected components of a bumper support post of a fall protection unit of the present invention.
Figure 16B:
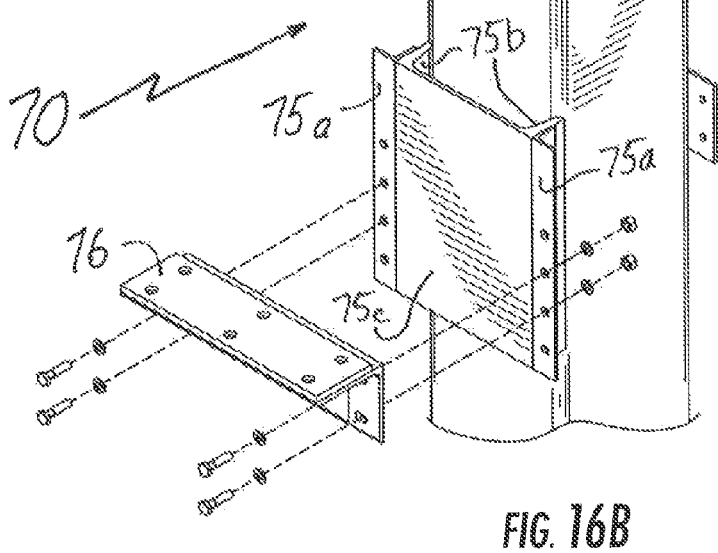
FIG. 16B is an elevated perspective view of embodiments of disassembled selected components of a bumper support post of a fall protection unit of the present invention.

As shown in FIG. 16A and FIG. 16B for example, the top 74 of each bumper support post 70 is configured as a truncated pyramid with a flat top surface 74a and four angled side surfaces 74b connecting the lower edge of each side surface 74b to the upper edge of each respective main side surface 70a of the bumper support post 70. As shown in FIG. 3B for example, desirably each side bracket 83 desirably carries at least one gripping tab 84 that elongates in a direction toward the opposing side bracket 83. Each gripping tab 84 desirably is formed by a flat steel plate that is fixed, as by welding for example, to the upper surface of the upper projecting flange 83a of the side bracket 83. If the carrier platform 40 were to be subjected to a significant down force as from a fall when a chain 53 were to break for example, when the respective alignment collar 80 reached the respective bumper support post 70, then the gripping tabs 84 will hit on the angled side surfaces 74b of the respective bumper support post 70 and serve to correct any misalignment between the opening of the alignment collar 80 and the respective bumper support post 70.

As shown in FIG. 16A for example, each of the bumper support posts 70 desirably is provided with attachment flanges 75a. The attachment flanges 75a desirably can be attached directly to opposite sides of the bumper support posts 70 as shown in FIG. 16A. A resting flange 76 desirably is formed by a right angle bar that is drilled with a plurality of holes that can be aligned with holes drilled through the attachment flanges 75a so that the resting flange 76 can be attached to the attachment flanges 75a by bolts, nuts and washers for example. When the barrier platform 40 is disposed in the working position as in FIG. 2 for example, then the barrier platform 40 will rest on and be supported by the resting flange 76. In particular, the lower projecting flange 82a of middle bracket 82 shown in FIG. 3B for example will rest on and be supported by the resting flange 76. The holes of the attachment flanges 75a are spaced uniformly apart and at different heights so that the elevation of the resting flange 76 can be adjusted to support the barrier platform 40 with its forklift rub rail 44 at a height that is just far enough above the elevation of the flatbed trailer 23 being serviced to make contact with a forklift truck 21 before the forklift truck 21 goes beyond the side edge 23b of the flatbed trailer 23. As shown in FIG. 3A for example, the mounting brackets 57c for the lower limit switches 57a also contain several sets of holes for attaching the lower limit switches at different heights and thereby to adjust the height of the working position of the barrier platform 40 with its forklift rub rail 44 at a height that is just far enough above the elevation of the flatbed trailer 23 being serviced to make contact with a forklift truck 21 before the forklift truck 21 goes beyond the side edge 23b of the flatbed trailer 23.

Different installation environments may require placement of a bumper support post 70 to be recessed with respect to the alignment that is defined by the other two bumper support posts 70 that support the barrier platform 40. In such instances, the resting flange 76 that is carried by the recessed bumper support post 70 might be recessed to such an extent that the resting flange 76 would not reside beneath the barrier platform 40 in the latter's working (i.e., lowered) disposition. As shown in FIG. 16B for example, the side legs 75b of an attachment plate 75c desirably extend in a direction that is normal to the flat plane of the attachment plate 75c and desirably can be fixed, as by welding for example, to the opposite sides of the bumper support post 70. Thus, the attachment plate 75c provides a forwardly-projecting base to which the resting flange 76 can be attached and compensates for the recessed alignment so that the resting flange 76 is positioned to support the barrier platform in line with the resting flanges 76 of the other two bumper support posts 70.

Figure 8B:
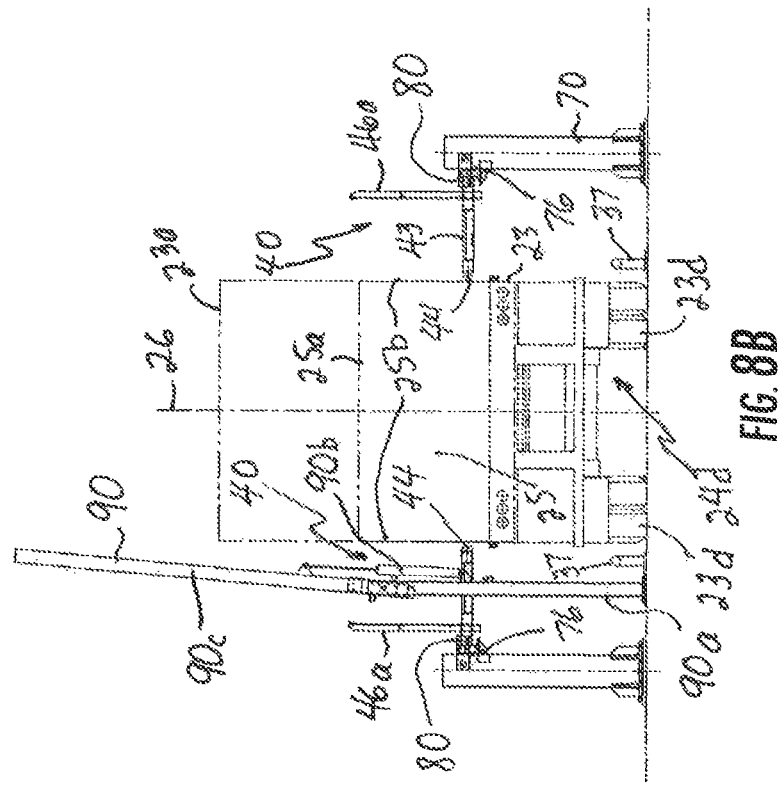
FIG. 8B is a front plan view of selected components in a second operative mode and taken along the lines of sight generally designated 8-8 in FIG. 3.
Figure 8A:
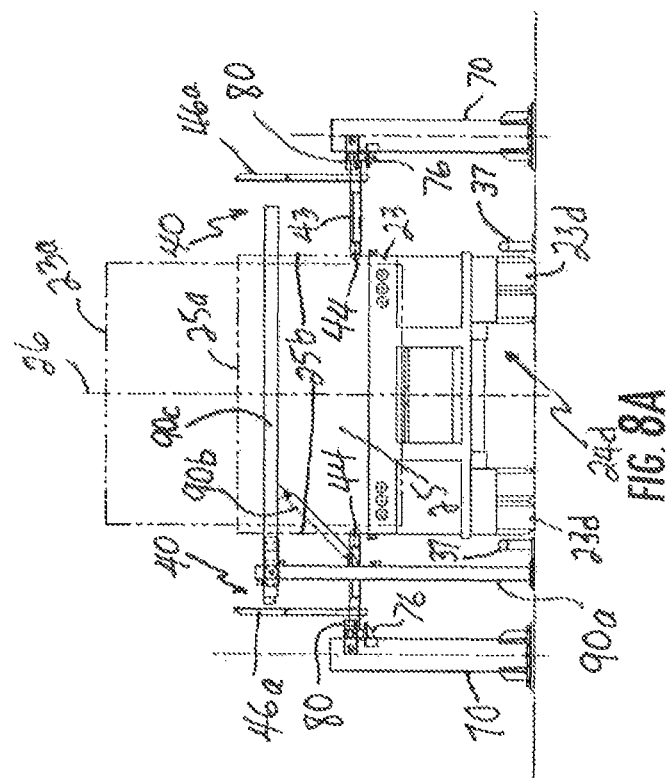
FIG. 8A is a front plan view of selected components in a first operative mode and taken along the lines of sight generally designated 8-8 in FIG. 3.

A selectively deployable gate desirably is disposed near at least a first end of the barrier platform and configured so that when this first gate is deployed, this first gate extends between opposing ends of opposing barrier platforms and across a first end of any flatbed trailer that is received in the loading bay 24d. Each of FIG. 3, FIG. 8A and FIG. 8B for example shows an embodiment of the forklift fall protection unit 30 that includes a barrier gate 90 that would be disposed at the rear of the flatbed trailer 23 closest to the loading dock 24 and would control access of the forklift truck 21 from the loading dock 24 to the flatbed trailer 23. In the embodiments shown, each of the support columns 90a for the barrier gates 90 is anchored at the ground level that carries the wheels 23d of the flatbed trailer 23 and rise vertically above the ground. One opposite end of a piston cylinder 90b desirably is pivotally connected to the support column 90a and the opposite end of the piston cylinder 90b is pivotally connected to the crossbar 90c, which has one end pivotally connected to the upper end of the support column 90a of the barrier gate 90. In the embodiments depicted in FIG. 8A and FIG. 8B for example, the envelope of the cab 23a is designated schematically by one set of chain-dashed lines. Moreover, each of the vertical chain-dashed lines running through the middle of the flatbed trailer 23 schematically designates the centerline 26 of the load 25, which has its top 25a and side envelopes 25b schematically outlined by the remaining chain-dashed lines. In FIG. 8A, the roof of the cab 23a is taller than the top 25a of the load 25, which is wider than the width of the cab 23a. In FIG. 8B, both the load 25 and the cab 23a are the same width, but the cab 23a is taller than the top 25a of the load 25.

As shown in FIG. 8A and FIG. 8B for example, the barrier gate 90 is not carried by either of the barrier platforms 40 and has its own support column 90a that rests on the ground. FIG. 8A has a view of the barrier gate 90 in the lowered position that prevents the forklift truck 21 from driving onto the flatbed trailer 23. FIG. 8B has a view of the barrier gate 90 in the raised position that permits the forklift truck 21 to be driven onto the flatbed trailer 23. The position of the barrier gate 90, raised or lowered, desirably is controlled by the control panels 35, 36 in coordination with the raising and lowering of the barrier platforms 40.

As shown in FIG. 2 for example, some flatbed trailers 23 have a headboard 23c disposed at the end of the flatbed trailer 23 next to the cab 23a. However, in those flatbed trailers 23 that lack a headboard 23c, there is nothing to prevent a person from falling over the front edge of the flatbed trailer 23. Accordingly, a selectively deployable gate desirably is disposed near at least one of the opposing ends of the barrier platform 40 and configured so that when this gate is deployed, this gate extends between the opposing ends of opposing barrier platforms 40 and across one end of any flatbed trailer 23 that is received in the loading bay 24d. Each of FIG. 3, FIG. 6, FIG. 9 and FIG. 10 shows a spring assist drop gate 96 that can be deployed at the front of the flatbed trailer 23 where the tractor cab 23a would be. Each spring assist drop gate 96 desirably is carried by one of the opposing barrier platforms 40 and has its own support column 96a that is attached to the one carrying barrier platform 40 wherein the spring assist drop gate 96 is selectively deployable and is pivotally attached to the support column 96a. In the embodiments depicted in FIG. 6 for example, the barrier platforms 40 are disposed in their operative position supported by the resting flange 76 of each bumper support post 70, though for the sake of simplicity the resting flange 76 has been omitted from this view of FIG. 6 for the bumper support post 70 that is disposed to support the barrier platform 40 that carries the spring assist drop gate 96. Typically, the barrier platform 40 that is located closer to the stair unit 47 will carry the spring assist drop gate 96, which desirably has a component that is a selectively collapsing and expanding parallelogram.

The forklift fall protection units 30 depicted in FIG. 7 are the same ones shown in FIG. 6 except that in the views depicted in FIG. 7, the drop gates 96 have been omitted from the barrier platforms 40 so as not to obscure the guard rail segments 46b, which are shown in the views depicted in FIG. 7. In the embodiments depicted in FIG. 6 and FIG. 7 for example, each of the vertical chain-dashed lines running through the middle of the flatbed trailer 23 schematically designates the centerline 26 of the load 25, which has its top 25a and side envelopes 25b schematically outlined by the remaining chain-dashed lines. Moreover, the flatbed trailer 23 in the loading bay 24d on the left hand side of each of FIG. 6 and FIG. 7 is wider and at a higher elevation above the ground than is the flatbed trailer 23 in the loading bay 24d on the right hand side of each of FIG. 6 and FIG. 7. The differences in width are apparent by viewing the spaces between the tire rub rails 37 and the tires of the flatbed trailers 23. The differences in elevation are apparent by viewing the spaces between cargo-carrying (i.e., working) surfaces of the flatbed trailers 23 and the forklift rub rails 44. Typically, the desired elevation distance between the cargo-carrying surfaces of the flatbed trailers 23 and the forklift rub rails 44 will be about eight inches to one foot, and this elevation distance may vary depending on the distance from the midpoint of the length of the flatbed trailer 23 due to the fact that the length of an empty flatbed trailer 23 typically displays a camber shape so that the midpoint of the length of the flatbed trailer 23 is at a higher elevation above the ground than the opposite ends of the length of the flatbed trailer 23. When the flatbed trailer 23 is fully loaded with the load centered around the midpoint of the flatbed trailer 23, then the weight of the load at the midpoint of the flatbed trailer 23 tends to eliminate the camber profile of the flatbed trailer 23 and thus even out the height of the cargo-carrying surface of the flatbed trailer 23 above the ground along the entire length of the flatbed trailer 23.

The left hand side of FIG. 6 shows the drop gate 96 deployed in its operative orientation after the tractor cab 23a has been disconnected from the flatbed trailer 23 and driven away. So as not to obscure the drop gate 96 in its lowered position, the guard rail segments 46b have been omitted from the barrier platforms 40 in the view depicted in the left hand side of FIG. 6. The right hand side of FIG. 6 shows the drop gate 96 deployed in its storage orientation, in which the drop gate 96 nevertheless would interfere with the load if the flatbed trailer 23 were to pull away from the loading bay 24d while the barrier platforms 40 were deployed in their operative and lowered positions as shown in the left hand loading bay 24d depicted in FIG. 6. So as not to obscure the drop gate 96 in its storage position, the guard rail segment 46b has been omitted from the barrier platform 40 that carries the drop gate 96 in the view depicted on the right hand side of FIG. 6.

In the embodiments depicted in FIG. 9 and FIG. 10 for example, the envelope of the cab 23a is designated schematically by one set of chain-dashed lines. Moreover, the chain-dashed line designated 25a schematically defines the top 25a of the load 25 carried by the flatbed trailer 23, and each of the chain-dashed lines designated 25b schematically defines the side envelopes 25b of the load 25. In each of FIG. 9 and FIG. 10, the roof of the cab 23a is taller than the top 25a of the load 25, which has the same width as the width of the cab 23a.

FIG. 9 depicts in two different deployment modes, the end of an embodiment of the forklift fall protection unit 30 that would be located at the end of the loading bay 24d near the cab 23a (not shown) of the flatbed trailer 23. So as not to obscure the drop gate 96 in its raised and lowered positions, the guard rail segment 46b has been omitted from the barrier platform 40 that carries the drop gate 96 in the view depicted in FIG. 9. The bumper support posts 70 are shown in the foreground in FIG. 9, and the portions of the carrier stanchions 50 rising above the bumper support posts 70 are visible behind the bumper support posts 70. Moreover, the wheels of the flatbed trailer 23 are closer to one of the tire rub rails 37 than to the other tire rub rail 37, indicating that the flatbed trailer 23 was parked somewhat askew and thus closer to one side of the loading bay 24d than to the other side of the loading bay 24d.

In the storage mode of the forklift fall protection unit 30 shown in upper portion of FIG. 9 for example, most of the lengths of the chains 53 are hidden inside the carrier stanchions 50 while the forklift fall protection unit 30 is raised near the upper ends of the carrier stanchions 50 and the drop gate 96 is fully retracted from spanning across the flatbed trailer 23. In the storage mode, the barrier platforms 40 of the forklift fall protection unit 30 are raised sufficiently near the upper ends of the carrier stanchions 50 so as not to interfere with the envelope (chain-dashed line) 23a that defines even the roof of the cab 23a of the flatbed trailer 23. In the operative mode of the forklift fall protection unit 30 shown in lower portion of FIG. 9 for example, the barrier platforms 40 of the forklift fall protection unit 30 are lowered near the working surface of the flatbed trailer 23 and with the drop gate 96 fully deployed and spanning across the flatbed trailer 23. Moreover, even though the flatbed trailer 23 was parked somewhat askew, the drop gate 96 nonetheless spans across the entire width of the flatbed trailer 23 in the operative mode.

FIG. 10 depicts in two different deployment modes, a middle portion of an embodiment of the forklift fall protection unit 30 that would be located at a section of the loading bay 24d near one of the carrier stanchions 50, and so no bumper support posts 70 are shown in the foreground. Similar to FIG. 9, the wheels of the flatbed trailer 23 in FIG. 10 are closer to one of the tire rub rails 37 than to the other tire rub rail 37, indicating that the flatbed trailer 23 was parked somewhat askew and thus closer to one side of the loading bay 24d than to the other side of the loading bay 24d. However, in FIG. 10, the flatbed trailer 23 in the loading bay 24d is narrower and its cargo-carrying surface at a lower elevation above the ground than is the flatbed trailer 23 depicted in the loading bay 24d in FIG. 9. The differences in width are apparent by viewing the spaces between the tire rub rails 37 and the tires of the flatbed trailers 23. The differences in elevation are apparent by viewing the spaces between the cargo-carrying surfaces of the flatbed trailers 23 and the forklift rub rails 44.

In the storage mode of the forklift fall protection unit 30 shown in FIG. 10 for example, most of the lengths of the chains 53 are hidden inside the carrier stanchions 50 while the barrier platforms 40 of the forklift fall protection unit 30 are raised near the upper ends of the carrier stanchions 50 and the drop gate 96 is not shown in this view. In the storage mode, the barrier platforms 40 of the forklift fall protection unit 30 are raised sufficiently near the upper ends of the carrier stanchions 50 so as not to interfere with the envelope (chain-dashed line) 23a that defines the roof of the cab 23a of the flatbed trailer 23. In the operative mode of the forklift fall protection unit 30 shown in the lower portion of FIG. 10, the barrier platforms 40 of the forklift fall protection unit 30 are lowered near the working surface of the flatbed trailer 23 and the chain 53 attached to the barrier platform 40 has been omitted from this view to avoid unduly cluttering this view.

Operation of an embodiment of the forklift fall protection unit 30 now will be described. When the loading bay 24d that is equipped with an embodiment of the forklift fall protection unit 30 is empty, the barrier platforms 40 are positioned in the storage position depicted in the upper portions of FIG. 9 and FIG. 10, the barrier gate 90 remains in the lowered position of FIG. 8A, and the side gate 47c of stair unit 47 remains locked in the position shown in FIG. 5 for example. Once the flatbed trailer 23 that is to be loaded or unloaded (as the case may be) has been backed into the loading bay 24d as shown in FIG. 2 for example, the operator of a forklift truck 21 will activate a descend switch (not shown) on the forklift operator control panel 36 on the loading dock 24 while the truck driver sitting in his seat in the cab 23a simultaneously activates a descend switch (not shown) on the cab control panel 35. Upon both of these descend switches being activated simultaneously, the control panels 35, 36 desirably are configured to activate the motors 32 to allow the barrier platforms 40 on both sides of the loading bay 24d to descend until they are in the working position shown in FIG. 2 and FIG. 4 for example. Because the control panels 35, 36 are positioned remotely from the barrier platforms 40 and the control panels 35, 36 are configured so that they do not activate the motors 32 unless both descend switches continue to be pressed simultaneously, neither the operator of the forklift truck 21 nor the driver of the cab 23a for the flatbed trailer 23 can be harmed by being struck by the descending barrier platforms 40.

Once the barrier platforms 40 on both sides of the loading bay 24d have descended into the working position shown in FIG. 2 and FIG. 4 for example, the respective main drive carriages 60 will trip the lower limit switches 57a that signal the control panels 35, 36 to de-activate the motors 32, raise the barrier gate 90 that permits the forklift truck 21 to be driven onto the flatbed trailer 23, unlock the side gates 47c of the stair unit 47 and lower the drop gate 96.

Since as noted above, the barrier gate 90 shown in FIG. 3 for example remains in the lowered position of FIG. 8A and the side gates 47c on the stair unit 47 remain locked until the barrier platforms 40 on both sides of the loading bay 24d have descended into the working position shown in FIG. 2 and FIG. 4 and tripped the lower limit switches 57a that cause the control panels 35, 36 to turn off the motor 32 and raise the barrier gate 90, the ascension of the barrier gate 90 on the end of the flatbed trailer 23 near the loading dock 24 informs the operator of the forklift truck 21 that it is safe to drive the forklift truck 21 onto the flatbed trailer 23 without fear of accidentally driving off the side edges 23b of the flatbed trailer 23. Similarly, the driver in the cab 23a and other workers are then able to access the walkways of the barrier platforms 40 via the side gates 47c from the platform 47b of the stair unit 47 and perform tasks on the flatbed trailer 23 while standing on the walkways of the barrier platforms 40.

When the flatbed trailer 23 has been completely loaded or unloaded, as the case may be, the workers exit from the barrier platforms 40, the driver returns to the cab 23a of the flatbed trailer 23 and the forklift truck 21 drives off the flatbed trailer 23 and onto the loading dock 24. The operator of the forklift truck 21 will activate an ascend switch (not shown) on the forklift operator control panel 36 on the loading dock 24 while the truck driver sitting in his seat in the cab 23a simultaneously activates the ascend switch (not shown) on the cab control panel 35. Upon both of these ascend switches being activated simultaneously, the control panels 35, 36 desirably are configured to activate the motors 32 to allow the barrier platforms 40 on both sides of the loading bay 24d to ascend until they are in the storage position shown in the upper portions of FIG. 9 and FIG. 10 for example. Once the barrier platforms 40 on both sides of the loading bay 24d have ascended into the storage position shown in the upper portions of FIG. 9 and FIG. 10 for example, the respective main drive carriages 60 will trip the upper limit switches 57b that signal the control panels 35, 36 to de-activate the motors 32, lower the barrier gate 90 that prevents the forklift truck 21 from being driven onto the flatbed trailer 23, lock the side gates 47c of stair unit 47 and raise the drop gate 96. Only then may the driver of the flatbed trailer 23 drive out of the loading bay 24d.

Depending on the desired or pre-existing infrastructure in place at the loading dock 24, a number of alternative configurations of the forklift fall protection unit 30 can be installed. As shown in FIG. 16B for example, in instances in which the forklift fall protection unit 30 is being installed as a retrofit to pre-existing infrastructure, the attachment flanges 75a can be attached to opposite side legs 75b of an attachment plate 75c. The attachment plate 75c allows an offset from the bumper support posts 70, which may need to be located so that the bumper support posts 70 do not interfere with pre-existing infrastructure where the retrofit is being installed.

While at least one presently preferred embodiment of the invention has been described using specific terms, such description is for illustrative purposes only, and it is to be understood that changes and variations may be made without departing from the spirit or scope of the following claims. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A forklift fall protection apparatus for a warehouse environment with a loading bay for receiving a flatbed trailer from which cargo can be loaded and unloaded by a forklift truck that services the flatbed trailer, the apparatus comprising:
   a. a first barrier platform disposed on a first side of the loading bay and a second barrier platform disposed on a second side of the loading bay opposite the first side of the loading bay;
   b. a first pair of carrier stanchions disposed to the first side of the loading bay and carrying the first barrier platform, each of the carrier stanchions of the first pair of carrier stanchions extending vertically above the loading bay and being spaced apart along the lengthwise direction of the loading bay;
   c. a second pair of carrier stanchions disposed to the second side of the loading bay and carrying the second barrier platform, each of the carrier stanchions of the second pair of carrier stanchions extending vertically above the loading bay and being spaced apart along the lengthwise direction of the loading bay;
   d. a first motor mechanically connected to the first barrier platform so that operation of the first motor selectively moves the first barrier platform vertically along the first pair of carrier stanchions;
   e. a second motor mechanically connected to the second barrier platform so that operation of the second motor selectively moves the second barrier platform vertically along the second pair of carrier stanchions;
   f. a first forklift rub rail carried by the first barrier platform and extending along substantially the entire length of the first barrier platform and disposed facing the second barrier platform;
   g. a second forklift rub rail carried by the second barrier platform and extending along substantially the entire length of the second barrier platform and disposed facing the first barrier platform;
   h. a first front main drive carriage connected to the first barrier platform, a first rear main drive carriage connected to the first barrier platform and spaced apart from the first front main drive carriage by a distance comparable to the distance separating the two carrier stanchions in the first pair of carrier stanchions, the first front main drive carriage slidably engaging one of the carrier stanchions of the first pair of carrier stanchions and the first rear main drive carriage slidably engaging the other one of the carrier stanchions of the first pair of carrier stanchions;
   i. a second front main drive carriage connected to the second barrier platform, a second rear main drive carriage connected to the second barrier platform and spaced apart from the second front main drive carriage by a distance comparable to the distance separating the two carrier stanchions in the second pair of carrier stanchions, the second front main drive carriage slidably engaging one of the carrier stanchions of the second pair of carrier stanchions and the second rear main drive carriage slidably engaging the other one of the carrier stanchions of the second pair of carrier stanchions; and
   j. wherein each respective main drive carriage being configured to cooperate with the respective slidably engaged carrier stanchion so as to resiliently absorb impacts from collisions between the forklift truck and the respective forklift rub rail of the respective barrier platform connected to the respective main drive carriage.

2. The apparatus of claim 1, wherein at least one main drive carriage includes a plurality of compression springs disposed to face the respective slidably engaged carrier stanchion so as to absorb impacts from collisions between the forklift truck and the respective forklift rub rail of the respective barrier platform connected to the respective main drive carriage.

3. The apparatus of claim 2, wherein at least a first one of the plurality of compression springs is a rubber compression spring.

4. The apparatus of claim 1, further comprising:
   a. a first plurality of bumper support posts disposed along the first side of the loading bay, each bumper support post of the first plurality of bumper support posts being spaced apart from each other bumper support post of the first plurality of bumper support posts and from each carrier stanchion of the first pair of carrier stanchions;
   b. a first plurality of alignment collars connected to the first barrier platform, each respective one of the first plurality of alignment collars being disposed to align vertically with a respective one of the first plurality of bumper support posts disposed along the first side of the loading bay;
   c. a second plurality of bumper support posts disposed along the second side of the loading bay, each bumper support post of the second plurality of bumper support posts being spaced apart from each other bumper support post of the second plurality of bumper support posts and from each carrier stanchion of the second pair of carrier stanchions;
   d. a second plurality of alignment collars connected to the second barrier platform, each respective one of the second plurality of alignment collars being disposed to align vertically with a respective one of the second plurality of bumper support posts disposed along the second side of the loading bay; and
   e. wherein each respective alignment collar being configured to cooperate with the respective bumper support post so as to absorb impacts from collisions between the forklift truck and the respective forklift rub rail of the respective barrier platform connected to the respective alignment collar.

5. The apparatus of claim 4, wherein at least a first one of the alignment collars includes a plurality of compression springs disposed to face the respective cooperating bumper support post so as to absorb impacts from collisions between the forklift truck and the respective forklift rub rail of the respective barrier platform connected to the respective first one of the alignment collars.

6. The apparatus of claim 5, wherein at least a first one of the plurality of compression springs is disposed to face in a direction that is normal to the direction that is faced by at least a second one of the plurality of compression springs.

7. The apparatus of claim 1, wherein at least one of the barrier platforms is configured to provide a level surface suitable to permit personnel to walk on the level surface and access from the level surface a flatbed trailer received in the loading bay.

8. The apparatus of claim 1, wherein the first motor is a hydraulic motor that is carried by the first pair of carrier stanchions and wherein the first motor and the heights of the first pair of carrier stanchions are configured to raise the first barrier platform high enough so that the flatbed trailer can be received in the loading bay without coming into contact with the first barrier platform.

9. The apparatus of claim 1, further comprising at least a first selectively deployable gate, said gate being disposed near a first end of the first barrier platform and configured so that when said first gate is deployed said first gate extends across a first end of the flatbed trailer that is received in the loading bay.

10. The apparatus of claim 9, further comprising a support column that is attached to the first barrier platform near the first end thereof wherein the selectively deployable gate is a pivotally attached to the support column and is a drop gate.

11. The apparatus of claim 9, further comprising at least a first selectively deployable barrier gate, the barrier gate being disposed near a second end of the first barrier platform and configured so that when the barrier gate is deployed the barrier gate extends across a second end of the flatbed trailer that is received in the loading bay, the second end of the flatbed trailer being disposed opposite the first end of the flatbed trailer.

12. The apparatus of claim 1, further, comprising:
  a. a driver control stand disposed near an entrance to the loading bay; and
  b. a driver control panel carried by the driver control stand and connected to control the motors.

13. The apparatus of claim 1, further, comprising:
  a. a forklift control stand disposed near an entrance to the warehouse; and
  b. a forklift control panel carried by the forklift control stand and connected to control the motors.

14. The apparatus of claim 1, further comprising a forklift rub rail carried by the first barrier platform and configured so that it will be disposed as the first point of contact between the first barrier platform and any forklift truck that approaches the first barrier platform and wherein the forklift rub rail is composed of hard, slippery plastic material.

15. A forklift fall protection apparatus for a warehouse environment with a loading bay for receiving a flatbed trailer from which cargo can be loaded and unloaded by a forklift truck that services the flatbed trailer, the apparatus comprising:
  a. a first barrier platform disposed on a first side of the loading bay and a second barrier platform disposed on a second side of the loading bay opposite the first side of the loading bay;
  b. a first pair of carrier stanchions disposed to the first side of the loading bay and carrying the first barrier platform, each of the carrier stanchions of the first pair of carrier stanchions extending vertically above the loading bay and being spaced apart along the lengthwise direction of the loading bay;
  c. a second pair of carrier stanchions disposed to the second side of the loading bay and carrying the second barrier platform, each of the carrier stanchions of the second pair of carrier stanchions extending vertically above the loading bay and being spaced apart along the lengthwise direction of the loading bay;
  d. a first motor carried by the first pair of carrier stanchions and mechanically connected to the first barrier platform so that operation of the first motor selectively moves the first barrier platform vertically along the first pair of carrier stanchions;
  e. a second motor carried by the second pair of carrier stanchions and mechanically connected to the second barrier platform so that operation of the second motor selectively moves the second barrier platform vertically along the second pair of carrier stanchions;
  f. a first forklift rub rail carried by the first barrier platform and extending along substantially the entire length of the first barrier platform and disposed facing the second barrier platform;
  g. a second forklift rub rail carried by the second barrier platform and extending along substantially the entire length of the second barrier platform and disposed facing the first barrier platform;
  h. a first front main drive carriage connected to the first barrier platform, a first rear main drive carriage connected to the first barrier platform and spaced apart from the first front main drive carriage by a distance comparable to the distance separating the two carrier stanchions in the first pair of carrier stanchions, the first front main drive carriage slidably engaging one of the carrier stanchions of the first pair of carrier stanchions and the first rear main drive carriage slidably engaging the other one of the carrier stanchions of the first pair of carrier stanchions;
  i. a second front main drive carriage connected to the second barrier platform, a second rear main drive carriage connected to the second barrier platform and spaced apart from the second front main drive carriage by a distance comparable to the distance separating the two carrier stanchions in the second pair of carrier stanchions, the second front main drive carriage slidably engaging one of the carrier stanchions of the second pair of carrier stanchions and the second rear main drive carriage slidably engaging the other one of the carrier stanchions of the second pair of carrier stanchions;
  j. a first plurality of bumper support posts disposed along the first side of the loading bay, each bumper support post of the first plurality of bumper support posts being spaced apart from each other bumper support post of the first plurality of bumper support posts and from each carrier stanchion of the first pair of carrier stanchions;
  k. a first plurality of alignment collars connected to the first barrier platform, each respective one of the first plurality of alignment collars being disposed to align vertically with a respective one of the first plurality of bumper support posts disposed along the first side of the loading bay;
  l. a second plurality of bumper support posts disposed along the second side of the loading bay, each bumper support post of the second plurality of bumper support posts being spaced apart from each other bumper support post of the second plurality of bumper support posts and from each carrier stanchion of the second pair of carrier stanchions;
  m. a second plurality of alignment collars connected to the second barrier platform, each respective one of the second plurality of alignment collars being disposed to align vertically with a respective one of the second plurality of bumper support posts disposed along the second side of the loading bay; and n. wherein each respective alignment collar being configured to cooperate with the respective bumper support post so as to absorb impacts from collisions between the forklift truck and the respective forklift rub rail of the respective barrier platform connected to the respective alignment collar.

16. The apparatus of claim 15, wherein at least a first one of the alignment collars includes a plurality of compression springs disposed to face the respective cooperating bumper support post so as to absorb impacts from collisions between the forklift truck and the respective forklift rub rail of the respective barrier platform connected to the respective first one of the alignment collars.

17. The apparatus of claim 16, wherein at least a first one of the plurality of compression springs is a rubber compression spring.

18. The apparatus of claim 15, wherein at least one of the barrier platforms is configured to provide a level surface suitable to permit personnel to walk on the level surface and access from the level surface the flatbed trailer received in the loading bay.

* * * * *